Sept. 19, 1961 D. F. WINNEK 3,000,288
APPARATUS AND METHOD FOR PROCESSING PHOTOGRAPHIC ELEMENTS
Filed May 15, 1957 12 Sheets-Sheet 1

INVENTOR.
DOUGLAS F. WINNEK
BY
ATTORNEYS

Sept. 19, 1961 D. F. WINNEK 3,000,288
APPARATUS AND METHOD FOR PROCESSING PHOTOGRAPHIC ELEMENTS
Filed May 15, 1957 12 Sheets-Sheet 2
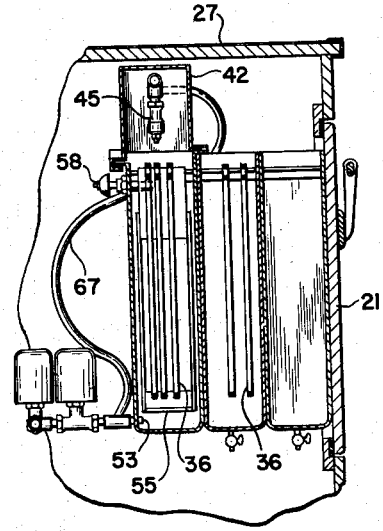
FIG. 3
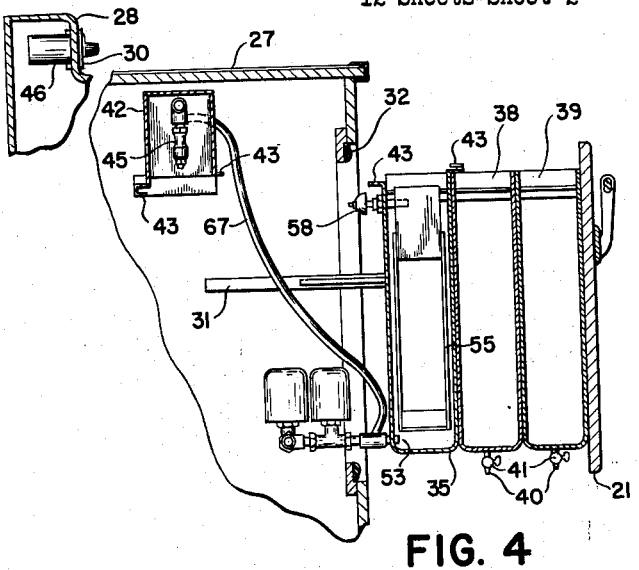
FIG. 4
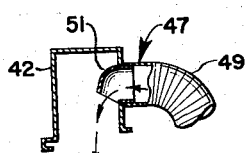
FIG. 6
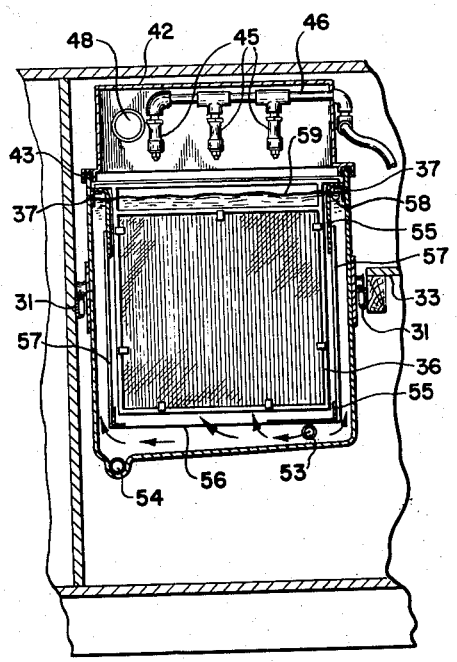
FIG. 5
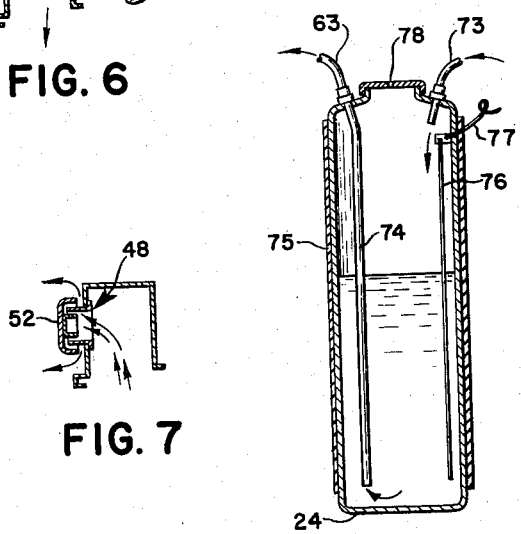
FIG. 7
FIG. 8
INVENTOR.
DOUGLAS F. WINNEK
BY
ATTORNEYS

| CIRCUITS | ONE COMPLETE CYCLE OF 5 DEGREE IMPULSES AT 45 SECONDS EACH | | | | | | | | | | | |
|---|---|---|---|---|---|---|---|---|---|---|---|---|
| | 6 | 12 | 18 | 24 | 30 | 36 | 42 | 48 | 54 | 60 | 66 | 72 |
| TIMER | | | | | | | | | | | | |
| TANK IN | | | | | | | | | | | | |
| DEV. IN | | | | | | | | | | | | |
| HYPO IN | | | | | | | | | | | | |
| WATER IN | | | | | | | | | | | | |
| WATER OUT | | | | | | | | | | | | |
| DEV. OUT | | | | | | | | | | | | |
| HYPO OUT | | | | | | | | | | | | |
| TANK OUT | | | | | | | | | | | | |
| DRYER | | | | | | | | | | | | |

Sept. 19, 1961   D. F. WINNEK   3,000,288
APPARATUS AND METHOD FOR PROCESSING PHOTOGRAPHIC ELEMENTS
Filed May 15, 1957   12 Sheets-Sheet 6

INVENTOR.
DOUGLAS F. WINNEK
BY
ATTORNEYS

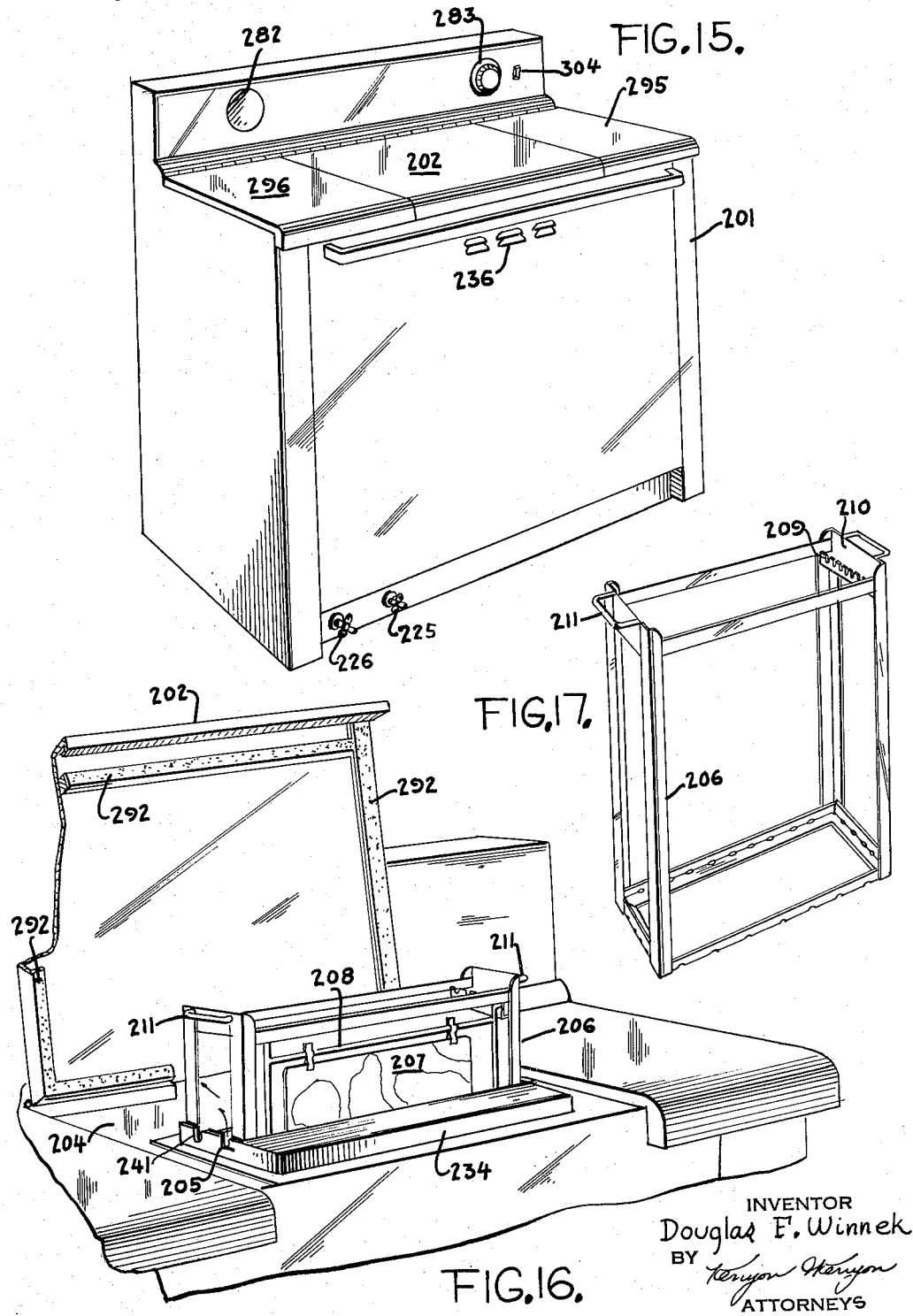

Sept. 19, 1961     D. F. WINNEK     3,000,288
APPARATUS AND METHOD FOR PROCESSING PHOTOGRAPHIC ELEMENTS
Filed May 15, 1957     12 Sheets-Sheet 8

INVENTOR
Douglas F. Winnek
BY
/ATTORNEYS

Sept. 19, 1961  D. F. WINNEK  3,000,288
APPARATUS AND METHOD FOR PROCESSING PHOTOGRAPHIC ELEMENTS
Filed May 15, 1957  12 Sheets-Sheet 9
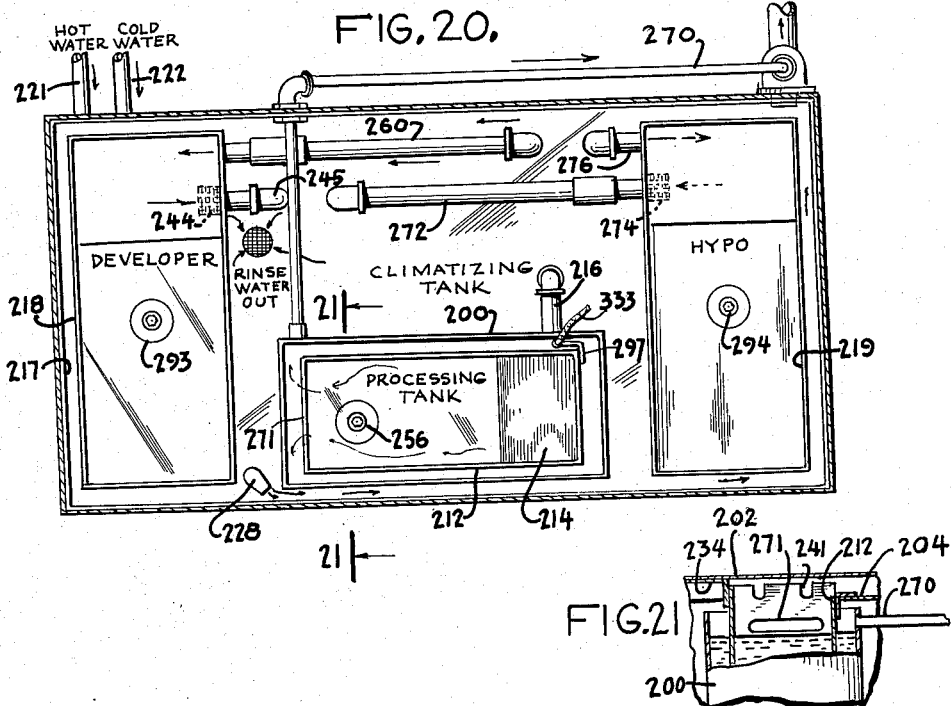
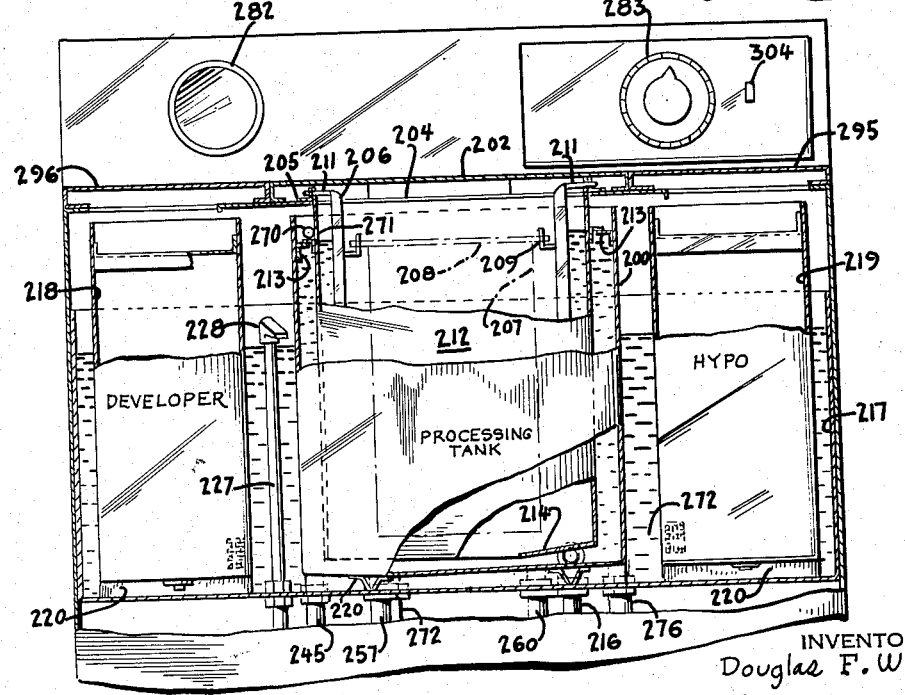
INVENTOR
Douglas F. Winnek
BY
Kenyon & Kenyon
ATTORNEYS Sept. 19, 1961  D. F. WINNEK  3,000,288
APPARATUS AND METHOD FOR PROCESSING PHOTOGRAPHIC ELEMENTS
Filed May 15, 1957  12 Sheets-Sheet 11

INVENTOR
Douglas F. Winnek
BY
Kenyon & Kenyon
ATTORNEYS 3,000,288
APPARATUS AND METHOD FOR PROCESSING
PHOTOGRAPHIC ELEMENTS
Douglas F. Winnek, Manhasset, N.Y., assignor to Autolab Corporation, Nassau County, N.Y., a corporation of New York
Filed May 15, 1957, Ser. No. 659,437
28 Claims. (Cl. 95—89)

This invention relates to apparatus and method for processing photographic elements such as photographic films, plates, papers and the like. It relates more particularly to apparatus and method for treating such elements with treating solutions adapted to modify as desired the photosensitive material of a photographic element that has been exposed to radiation.

This application is a continuation-in-part of application Serial No. 515,826 filed June 16, 1955.

In typical processing of a photographic element the element is developed, rinsed, fixed, washed and dried. There are many well known developing solutions for use in the developing step. Likewise different types of fixing solutions are well known. The rinsing and washing steps are usually accomplished with water. In the processing of photographic elements other solutions are sometimes used, but in the case of photographic elements used in ordinary photography or X-ray work the foregoing are the basic processing steps and these operations are referred to as typical for the purpose of describing and exemplifying the practice of this invention.

For many years photographic elements have been processed using separate processing containers for the developing and fixing solutions and employing appropriate means for carrying out the rinsing, washing and drying operations, the different manipulations and transfers being effected by hand. In such case the manual operations involved are not only time-consuming but also require the constant attention of an operator. Moreover, for large scale commercial processing a very substantial amount of floor space is required. Heretofore attempts have been made to eliminate much of the manual handling that is involved in the processing of photographic elements in the manner above referred to. These attempts have been principally in the direction of providing mechanisms which utilize separate baths in different compartments, the mechanism in the main merely replacing the hands and fingers of a skilled operator. In this type of equipment the photographic element is suspended by appropriate hanger means and the photographic element held thereby is repeatedly immersed, lifted up, moved along, reimmersed, and so on until all of the various processing steps have been completed.

In the development of a photographic element there are a number of different factors which have to be taken into account in order that a satisfactory result may be obtained. The chemical reactions involved are of a very sensitive nature and extreme care has to be taken in order to obtain the desired optical density and contrasts in optical density, as well as uniformity throughout and freedom from flaws. In the initial development of an exposed photographic element both the temperature of the developing solution and the time of its contact with the photographic element are highly important. Moreover, the extent to which the photographic element is agitated relative to the developing solution plays an important part, for non-uniformity results either from too much agitation or from too little agitation. Likewise aerial fog may occur if there is excessive exposure to air while the element is moistened with the developing solution.

In order that automatic processing equipment may produce satisfactory results, the processing equipment above referred to that has been used commercially heretofore has been very elaborate, costly and bulky. By way of illustration, one type of apparatus for processing X-ray films, e.g., 14" x 17" films at the rate of one per minute, is such as to require from about 200 to 300 sq. ft. of floor space and the service of a plurality of operators even though the equipment is designed to operate automatically. For obtaining the required standards for quality elaborate means are used for repeatedly immersing and removing hangers from the solution baths as well as their transfer from station to station and the provision of intermittent vibration of the hangers designed to create an amount of agitation that is regarded as the most desirable. While equipment of this type enables photographic elements to be processed with the production of satisfactory developed images, nevertheless the bulk and cost of the equipment is such that it usually is impractical except in the case of large scale processing and even for such uses the cost and bulk of the equipment in relation to its efficiency in operation constitutes a very serious drawback. Notwithstanding the disadvantages and drawbacks of such equipment, the bulk of the processing equipment used today is of this type.

Proposals have been made heretofore to utilize a single processing tank in which an exposed photographic element is subjected successively to the various treating solutions, but such proposals have not found substantial commercial applications for various reasons such as lack of efficiency and inferior results.

It is an object of this invention to provide apparatus and method for processing an exposed photographic element which enables an exposed photographic element to be developed with resultant image perfection of a very high order while at the same time employing a processing unit which, while fully automatic, is relatively inexpensive and is of such small size as to be adapted for use wherever needed, preferred embodiments adapted for developing 14" x 17" X-ray films, for example, being comparable in size to an ordinary filing cabinet occupying only five or six sq. ft. of floor space. A further object of this invention is to provide method and apparatus whereby exposed photographic elements may be processed rapidly and with a high degree of efficiency from the point of view of output in relation to initial investment and operating costs.

Another object of this invention is to provide apparatus and method for processing photographic films whereby conditions are provided and maintained for obtaining optimum results as regards development of desired density and contrast as well as uniformity and freedom from flaws. A further object of this invention is to provide apparatus for processing an exposed photographic element whereby except for the initial loading, the employment of dark room illumination is not required. Another object of this invention is to provide apparatus for processing an exposed photographic element which is portable and easily installed and which may be readily serviced as regards the solutions employed. Another object of this invention is to provide apparatus for processing the exposed photographic element which is fully automatic and is adapted to subject the element to the developing cycle from initially dry to finished dry condition without the attention of an operator and to enable a plurality of exposed photographic elements to be so processed simultaneously, thereby providing a large output capacity.

Features and advantages of this invention relate to means and method whereby the aforesaid objects may be attained utilizing a single processing tank adapted for the disposition of one or more exposed photographic elements in contact with the solution contained therein.

Further features and advantages of this invention relate to means and method by which the processing solutions and rinsing and washing liquid are introduced into and withdrawn from the processing tank for effective and properly timed contact with an exposed photographic element within the tank. Other features of this invention relate to the means and method employed for filling a processing tank, maintaining turbulence therein and emptying said tank.

Further features of this invention relate to the means and method employed for filling and emptying said tank and for maintaining turbulence therein utilizing treating solutions from a plurality of reservoirs and a washing liquid. Other features and advantages of this invention reside in the employment of conduit and fluid impelling means which are common to the plurality of solutions for effecting their ingress and egress with respect to the processing tank while at the same time avoiding solution contamination.

Further features and advantages of this invention relate to the means and method employed for bringing into contact with a photographic element a treating solution used in processing and for controlling the timing of such contact.

Further features and advantages of this invention reside in the method and means whereby the treating solutions and washing liquid are brought into contact with an exposed photographic element for providing optimum conditions as regards timing and the kinetics of contact of the fluid with the exposed photographic element.

Further features and advantages of this invention reside in the provision of a processing tank comprised in a movable drawer of an apparatus unit which merely has to be pulled forward for loading undeveloped exposed photographic elements and for removing the elements after they have been completely processed and dried, the entire processing being carried out automatically when the drawer is closed. Other features and advantages of this invention reside in the provision, in combination with a processing tank comprised in a movable drawer, of a cover relative to which the drawer is movable, the cover means comprising part of the processing means which is utilized when the drawer is in closed position.

Further features and advantages of this invention relate to the means and method employed for maintaining uniform temperature conditions during processing and as between the different solutions used and the washing liquid. Further features and advantages relate to means and method for handling the washing liquid that is used as regards its maintenance in reserve at proper temperature, its initial introduction into the processing tank, and its further introduction during a period of recycling with attendant overflow of excess followed by rapid removal of the wash liquid from the system.

Further features of this invention relate to method and means for efficient reutilization of the solutions employed with a minimum of wastage or contamination. More particular features in this category relate to the means for effective removal of solution from the conduits that are used, to the valving and manifolding employed and to the valve combinations whereby preferred operational performance may be attained. Other features and advantages of this invention relate to the baffling employed in the processing tank whereby preferred exposure to the action of the processing solutions and to washing liquid is obtained.

Further objects, features and advantages of this invention will be apparent from the following description of certain typical embodiments of this invention which have been shown for purposes of exemplification in the accompanying drawings; wherein:

FIG. 3 is a sectional elevation taken on the line 3—3 of FIG. 2 showing the processing tank comprised in the movable drawer and the stationary cover therefor, the drawer being in closed position;

FIG. 4 is similar to FIG. 3 but with the drawer in open position;

FIG. 5 is a sectional elevation taken on the line 5—5 of FIG. 2 and showing further detail respecting the processing tank comprised in the drawer;

FIG. 6 is a detail sectional elevation taken on the line 6—6 of FIG. 2 and showing the air inlet into the cover for the processing tank;

FIG. 7 is a detail sectional elevation taken on the line 7—7 of FIG. 2 and showing the drying air outlet from the cover of the processing tank;

FIG. 8 is a sectional elevation of one of the solution containers used in the unit;

FIG. 15 is a perspective view of an alternative preferred embodiment of this invention;

FIG. 16 is a perspective view on a larger scale of a portion of the embodiment shown in FIG. 15, with one of the covers in open position and with the element holding rack in partially removed position with reference to the processing tank;

FIG. 17 is a perspective view of the element holding rack shown in FIG. 16 after its removal from the unit;

FIG. 20 is a plan view of climatizing tank employed in the embodiment of FIG. 15 and of the parts encompassed thereby, and the connections therefor;

FIG. 21 is a detail sectional view of the top portion of the processing tank taken on the line 21—21 of FIG. 20;

FIG. 22 is a front elevation partially broken away of the climatizing tank shown in FIG. 20 and showing its relation to the upper portion of the cabinet;

Figure 2:
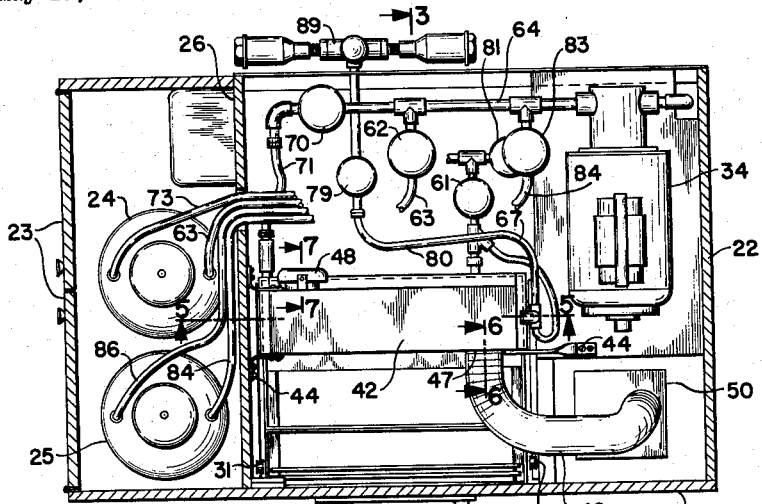
FIG. 2 is a plan view of the unit shown in FIG. 1 taken on the line 2—2 of FIG. 1 and showing the arrangement of the principal operating components, some of which have been omitted for clarity in the showing.
Figure 1:
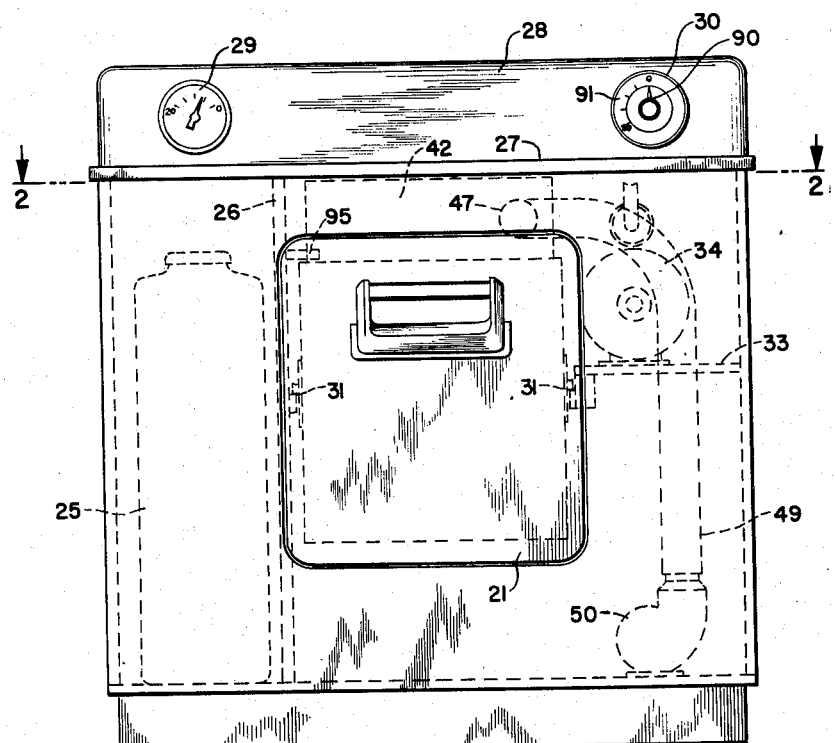
FIG. 1 is a front elevation of a processing unit embodying this invention, the front of the housing cabinet being shown and certain of the operating parts being indicated schematically in dotted lines to illustrate the general arrangement.

With reference to the embodiment of this invention shown in FIGS. 1–12, the operating components of the apparatus are shown in assembled relation which, while including solution reservoirs, requires a cabinet which is only about 36" in height and which occupies only about 26" x 40" of floor space. A typical arrangement of the operating components within the cabinet is shown particularly in FIGS. 1–5, although for purposes of clarity all of the operating components have not been shown in these figures. The cabinet as illustrated comprises the front wall 20 having the drawer 21 mounted therein in a generally centrally disposed position. The cabinet may have the end wall 22 at one end thereof and the hinged doors 23 at the other end thereof for providing access to the bottle-shaped reservoirs 24 and 25 for the developing solution and the fixing solution, respectively. These reservoirs may be separated from the other parts of the equipment within the cabinet by the partition 26. The cabinet may be provided with the working top 27 and at the rear thereof a backboard 28 is preferably provided. A thermometer scale 29 and the dial 30 of the timer may be conveniently mounted on the backboard 28.

The drawer 21 is carried by suitable means so that it may be readily pulled out with reference to the cabinet to the position shown in FIG. 4. Any suitable carrying device for the drawer may be employed such as the longitudinally slidable rail devices 31 of conventional structure which preferably comprise rollers for facilitating manipulation of the drawer as well as suitable stop means which normally limits the extent to which the drawer may be pulled out. Suitable stop members 32 may be provided for controlling the limit of the inward movement of the drawer. As shown, one of the devices 31 may be carried by the partition 26 and the other may be carried by the margin of a shelf 33 which also is employed as a support for the motor-driven pump 34.

The drawer 21 comprises the processing tank 35. The size of the processing tank will depend upon the size of the photographic elements to be developed therein. For example, the processing tank may be of such size as to accommodate X-ray films measuring about 14" x 17" as carried by suitable hangers 36 which may be supported by suitable support rail means 37 adjacent the upper margin of each end of the processing tank. A processing tank having a capacity in the neighborhood of five gallons will accommodate up to about 12 hangers for X-ray films of the size mentioned.

The drawer 21 also comprises the tank compartments 38 and 39 which may, if desired, be used merely for convenient storage of hangers 36 when they are not disposed in the processing tank. However, either or both of the tanks 38 and 39 may be utilized for containing a liquid and either or both would be available for use in manual development of X-ray films in the event of possible emergencies such as a community power failure. These tanks may also be used for other purposes, as will be mentioned hereinbelow. For possible use under such conditions the tanks 38 and 39 are preferably provided with drains 40 controlled by the hand valves 41.

When the drawer 21 is in the inwardly disposed position shown in FIGS. 2 and 3 the top of the processing tank 35 is in liquid-tight engaged relation with the cover 42. The liquid-tight relation between the top of the tank 38 and the cover 42 may be provided by the tongue and groove elements 43 which are shown most clearly in FIG. 4 and which telescope with each other to provide the water-tight union when the drawer is closed. The cover 42 is carried in fixed relation with respect to the cabinet as by the brackets 44.

Within the cover 42 there are mounted the spray nozzles 45, the spray nozzles 45 being connected to the common header line 46 which extends through one end of the cover. The spray nozzles 45 are disposed above the hangers 36 and are adapted to produce a fine spray or atomized mist which quickly and effectively subjects the surfaces of a film held by the hangers 36 to a thorough drenching with the liquid that is sprayed from the nozzles.

The cover 42 also comprises inlet means 47 and outlet means 48 for drying atmosphere, the inlet means and outlet means being shown in detail in FIGS. 6 and 7, respectively. The inlet means 47 is connected by an air conduit 49 to a blower 50 which comprises a heating element (not shown) so as to blow heated air through the conduit 49 and through the inlet 47 into the cover 42. A directional baffle 51 is utilized so as to direct the incoming stream of heated air downwardly into the region of the hangers 36 so as to carry off moisture from films carried by the hangers. As shown in FIG. 7, a baffle cover 52 may be employed overlying the outlet 48 so as to permit the drying atmosphere to escape while at the same time preventing possible ingress of light to the region within the processing tank 35.

The processing tank 35 is provided with a solution inlet 53 and with a solution outlet 54, the bottom of the tank being sloped toward the outlet for facilitating drainage. Spaced from the inner walls of the processing tank 35 there is provided the baffle shell 55 which comprises continuous walls in the region of films handled by the hangers 36 except for the opening 56 in the bottom thereof and the opening 57 at each end thereof. The baffle shell 55 controls the direction of liquid currents introduced into the processing tank 35 through the inlet 53 so as to prevent excessively forceful contact of the incoming solution with films carried by the hangers while at the same time using the flow of incoming solution so as to uniformly set up controlled fluid turbulence with reference to one or more films or other photographic elements carried by the hangers 36 within the processing tank.

Adjacent the upper portion of the inner wall of the processing tank there is disposed a level-controlling probe 58 for the purpose of controlling the level of liquid within the processing tank, as will be described more in detail hereinbelow, the liquids being indicated at 59 in FIG. 5. In typical processing of a film such as an X-ray film the liquids employed are a developing solution, a fixing solution and water, the latter being used for rinsing and washing. For purposes of brevity, the reservoir bottle used for storing the fixing solution has been marked in the drawings with the legend "Hypo."

Figure 9:
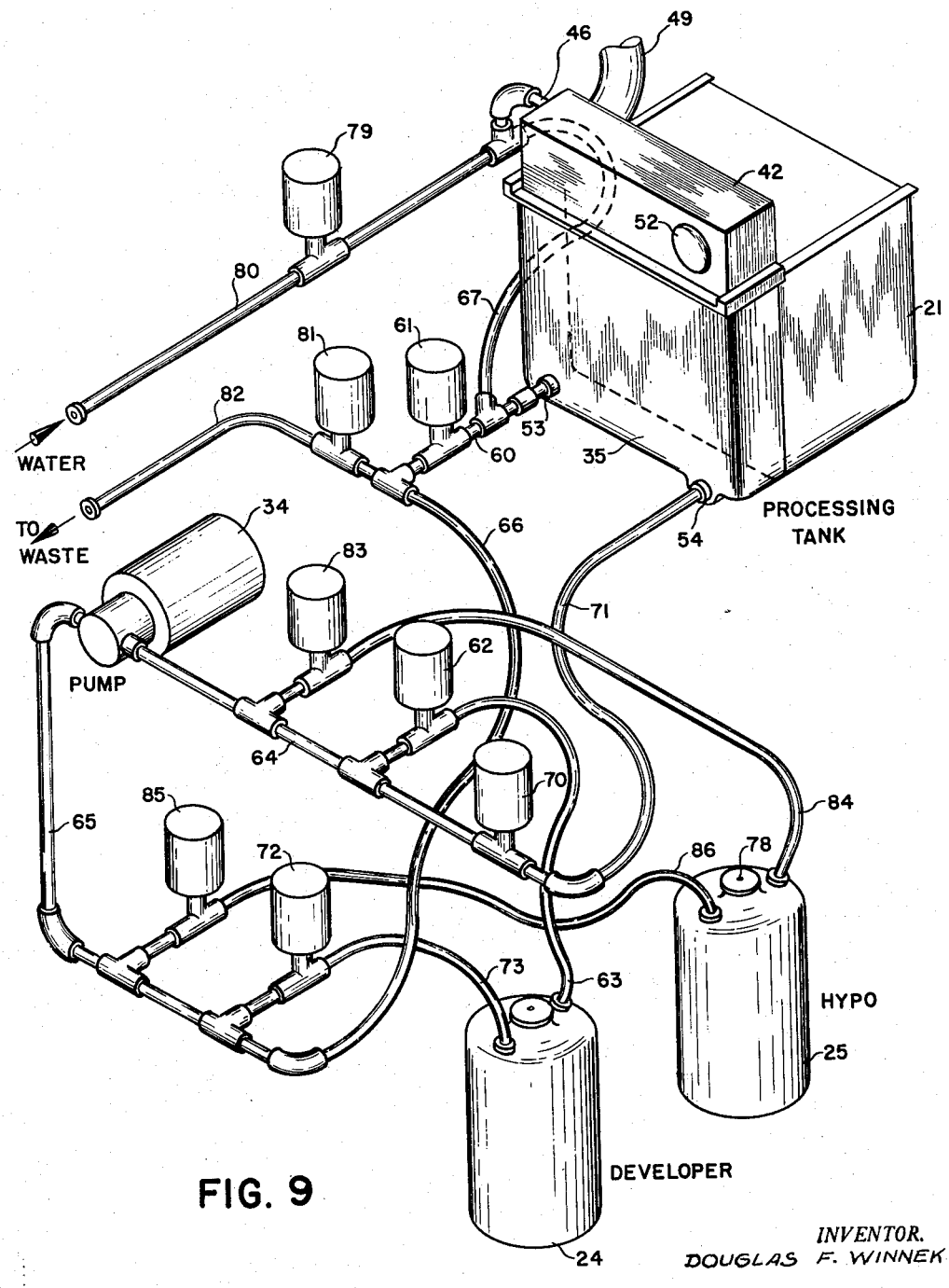
FIG. 9 is a perspective view of the liquid handling operating components of the unit shown in FIGS. 1–8 with their relative separation exaggerated for clarity in the showing and with the cabinet housing removed.
Figures 10, 11:
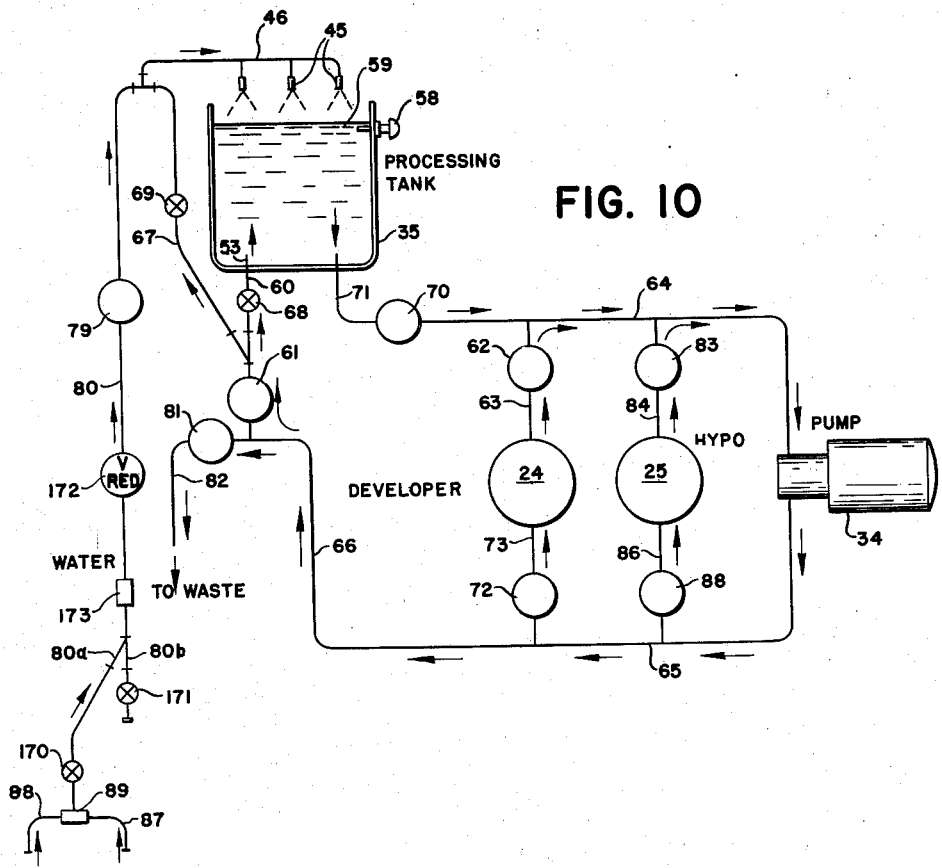
FIG. 10 is a schematic flow diagram of the liquid handling operating components of the unit shown in FIGS. 1–9.
FIG. 11 is a timing chart exemplifying the relative timing of the operational components of the unit shown in FIGS. 1–10.

With further reference to FIGS. 9 and 10, the fluid handling components of the embodiment of this invention shown in FIGS. 1–12 will now be described. In this embodiment the control of the flow in the various lines is effected by solenoid valves, each of the solenoid valves being of the type which is normally closed and which is actuated electrically to open it. The flow of both the developing solution and the fixing solution is effected by a single pump which likewise is used for providing a forceful withdrawal of washing liquid from the processing tank and directing it to waste. For introducing wash water into the processing tank one may utilize the water pressure provided by the public service in the area where the apparatus is used.

Extending rearwardly of the inlet 53 of the processing tank 35 there is disposed the inlet line 60 which is controlled by the "tank in" solenoid valve 61. For introducing developing solution from the reservoir 24 into the processing tank 35 the "developer in" solenoid valve 62 may be opened in addition to the "tank in" valve 61, Then, the other solenoid valves being closed, the developer solution will be impelled by the pump from the reservoir 24 by the line 63 that is controlled by the "developer in" solenoid valve 62, through the pump inlet header line 64, through the pump outlet header line 65, through the flexible hose 66 and, lastly, through the line 60 which introduces the developer into the processing tank through the inlet 53. It is preferable that the capacity of the pump and these liquid lines which provide the liquid supply conduit means for the developer have substantial flow capacity so that the processing tank 35 may be rapidly filled. For example, it is preferable to fill the processing tank with developing solution in about 15 to 30 seconds. By way of example, this can readily be accomplished in the case of five gallon processing tank using half inch internal diameter conduits and a pump which delivers liquid at a pressure of about 20 pounds per sq. in.

In addition to the inlet line 60 which communicates with the interior of the processing tank through the inlet 53 a spur line 67 preferably is utilized which provides communication between the inlet line 60 and the header 46 for the spray nozzles 45. By use of the spur line 67 which is connected as aforesaid the developing solution may be simultaneously introduced into the processing tank at the bottom thereof in en masse liquid form and in the top of the processing tank in spray mist or atomized form. In this manner the entire area of films or other photographic elements within the processing tank may be virtually instantaneously contacted throughout with developing solution. In order to provide adjustable control with regard to the amount of solution which flows en masse into the bottom of the processing tank and is introduced in spray form at the top of the processing tank a manually actuated valve 68 may be disposed in the inlet line 60 and the manualy actuated valve 69 may be disposed in the spur line 67, as shown diagrammatically in FIG. 10. Using developing solutions having conventional speed characteristics, use of the spur line 67 may be dispensed with without appreciable sacrifice in the uniformity of the development of films or other photographic elements within the processing tank. For this reason the valve 69 may under certain circumstances be closed altogether. Moreover, for certain types of work the spur line 67 may be omitted. However, especially when a developer is used under conditions providing very rapid development it is preferable to utilize the spray nozzles 45. In typical practice, one-third of the solution delivered into the processing tank may go to the nozzles 45 and the remaining two-thirds may enter through the inlet 53.

As mentioned above, the device is such that the processing tank may be filled very rapidly, and as soon as the predetermined desired liquid level 59 has been attained the outlet 54 is brought into operation so as to remove solution from the processing tank at substantially the same rate at which it is introduced so as to thereby maintain the level of solution in the processing tank substantially constant and so as to provide liquid motion which maintains the turbulence that enables the developing operation to be carried out both rapidly and with uniformity, the turbulence being controlled so as to neither be excessive nor be too little to be consistent with the attainment of desired rapidity and uniformity of development. Upon thus utilizing the liquid level probe 58 to simultaneously close the "developer in" solenoid 62 and to open the "tank out" solenoid 70, the other solenoids being closed, the developing solution is directed from the tank outlet 54 by the flexible hose connection 71 to the pump inlet header line 64, with the result that the developer will be circulated by the pump from the processing tank 35 and back to the processing tank 35 while maintaining the liquid level within the processing tank substantially constant.

Liquid return conduit means for return of the developer to the reservoir bottle 24 from the processing tank 35 may then be provided by opening the "developer out" solenoid 72 in the line 73 and simultaneously closing the "tank in" solenoid valve 61. In such case the pump, which continues to operate, serves to withdraw the developing solution from the processing tank 35 and return it rapidly to the reservoir bottle 24 for the developing solution, preferably during a period of about 15 to 30 seconds.

The reservoir bottle 24 is shown in detail in FIG. 8. The developer supply line 63 from the exit of the bottle comprises the extension 74 which extends to adjacent the bottom of the bottle so as to permit the withdrawal of substantially all of the developing solution within the bottle. The developer return line 73 discharges the returned developer into the space within the bottle 24. Preferably the bottle 24 is surrounded by a jacket 75 which is utilized so as to maintain the temperature of the solution within the bottle at that temperature which is desired for development. A suitable temperature is in the neighborhood of 68° F. A thermometer 76 is provided within the reservoir bottle 24 which is operatively connected to the thermometer scale 29 shown in FIG. 1 by the connecting line 77. The jacket 75 may comprise thermostatically controlled heating means or cooling means, or both as may be desired, depending on the conditions encountered and to be maintained. An air vent 78 is provided in the top of the bottle reservoir 24 so as to permit the removal and return of developing solution.

The bottle reservoir used for the fixing solution is essentially similar to that hereinabove described for the developing solution except that ordinarily the thermometer is not utilized in the bottle reservoir for the fixing solution.

After the developing solution has been returned to the reservoir bottle 24 and the developing solution has all been removed from the processing tank 35 the films or other exposed photographic elements may forthwith be rinsed with water by spray application from the spray nozzles 45. To accomplish this the "developer out" solenoid valve 72 is closed, the "water in" solenoid valve 79 in the water inlet line 80 is opened and the "water out" solenoid valve 81 in the line 82 going to waste likewise is opened. Under these conditions, and all the rest of the solenoid valves being closed, the rinse water will rinse the developed films in the processing tank 35 and flush out all portions of the liquid circulating system except for the developer supply line 63 and the developer return line 73 which throughout the complete cycle do not handle any solution or liquid other than the developing solution. The rinse water is removed from the processing tank and taken to waste as rapidly as it is collected in the processing tank. Because of the adjustment of the valve 69 in the spur line 67 the rinse water will be caused to be discharged through the spray nozzles 45 and likewise will flush the spur line 67 and the tank inlet line 60.

The fixing solution in the reservoir bottle 25 may next be supplied to the processing tank. This may be accomplished by closing the "water in" solenoid valve 79, the "water out" solenoid valve 81 and the "tank out" solenoid valve 70 and by opening the "tank in" solenoid valve 61 and the "hypo in" solenoid valve 83 which is in the line 84. Under these conditions the fixing solution from the reservoir bottle 25 is pumped into the processing tank 35 in the same way that the developing solution was previously pumped in, as described hereinabove. As soon as the fixing solution reaches the liquid level 59 the "hypo in" solenoid valve 83 is closed and the "tank out" solenoid valve 70 is opened so as to maintain a circulation of fixing solution while the level in the processing tank 35 remains substantially constant. By thereafter closing the "tank in" solenoid valve 61 and opening the "hypo out" solenoid valve 85 in the line 86 continued operation of the pump serves to return all of the hypo from the processing tank 35 to the reservoir bottle 25.

After the fixing solution has been returned to the reservoir bottle 25, the "hypo out" solenoid valve 85 may be closed and the "water in" and "water out" solenoid valves may be opened, whereupon the films or other photographic elements in the processing tank may be subjected to washing with water until the desired amount of washing has been completed.

For both the rinsing and final washing it is usually desirable that the water used for washing be at a temperature that is substantially the same as that at which the developing solution is maintained. For this purpose it is usually preferable, as indicated in FIGS. 2 and 10, to connect the water supply line 80 with both a hot water supply and a cold water supply and to use a mixing device which commingles the hot and cold water in such proportion as to provide the temperature desired. Thus the unit may be connected with a hot water line 87 and a cold water line 88, both of which enter the mixing device 89 that is adapted to discharge water therefrom to the line 80a at the temperature for which the device 89 is set. Alternatively, wash water may be supplied through the extension 80b of the line 80. For shutting off either or both of the lines 80a and 80b suitable valves 170 and 171, respectively, may be employed. Likewise it is desirable that the wash water be admitted under pressure corresponding to that provided by the pump 34. For example, it has been found very satisfactory to employ a pump with a pressure of about 20 lbs. per sq. in. and in such case it is desirable to employ in the line 80 a pressure reducing and regulating valve 172 designed to pass the wash water therefrom at a pressure of substantially 20 lbs. per sq. in. after having been received from a source maintained at a higher and possibly variable pressure. Preferably the line through which the incoming wash liquid is supplied comprises a strainer 173. Similar means for introducing water at a controlled predetermined temperature have been shown in connection with the embodiments shown in FIGS. 13 and 14 where like reference characters are employed.

It will be seen from the foregoing that liquid circuit means is provided for supplying developing solution to the processing tank from a reservoir therefor and returning it from the tank to the reservoir. Similar circuit means is provided for the fixing solution and each of these liquid circuit means has a portion that is in common with the other and that comprises the impelling pump means. The common portion of the circuits above mentioned likewise is shared by the liquid circuit means for the water or other washing liquid, with the result that not only the films or other photographic elements are washed after treatment with either the developing solution or the fixing solution, but also all portions of the liquid system that are used in common by the developing solution and by the fixing solution so that these solutions at no time are contaminated one with the other and can be used repeatedly in essentially the same way as though the apparatus were of the type wherein separate tanks are used for developing solution and fixing solution and a film or other photographic element is washed after removal from one tank and before being transferred to another tank. It also is the case that a single pump positively provides the liquid movement with rapidity and under exact control in each of the different circuits that are utilized during processing, this same pump means likewise being utilized to maintain the desired turbulence within the processing tank.

The liquid circulating means hereinabove described as combined with the processing tank 35 provides means for processing an exposed photographic element through the steps of developing, rinsing, fixing and final washing. The photographic elements may be removed from the processing tank and dried elsewhere but advantageously drying is accomplished while the photographic elements remain in the processing tank 35. This result may be accomplished after the washing has been completed and excess water has been removed from the processing tank and then, when all of the solenoid valves which control the liquid lines have been closed, energizing the air blower 50 and the heating element means comprised therein so as to blow heated air through the air conduit 49 into the processing tank 35 and over the surfaces of such photographic elements as may be contained therein, vapor-laden air escaping through the air outlet 52. After the photographic elements have been dried to desired extent the blower and heating element therein may then be deenergized.

Figure 12:
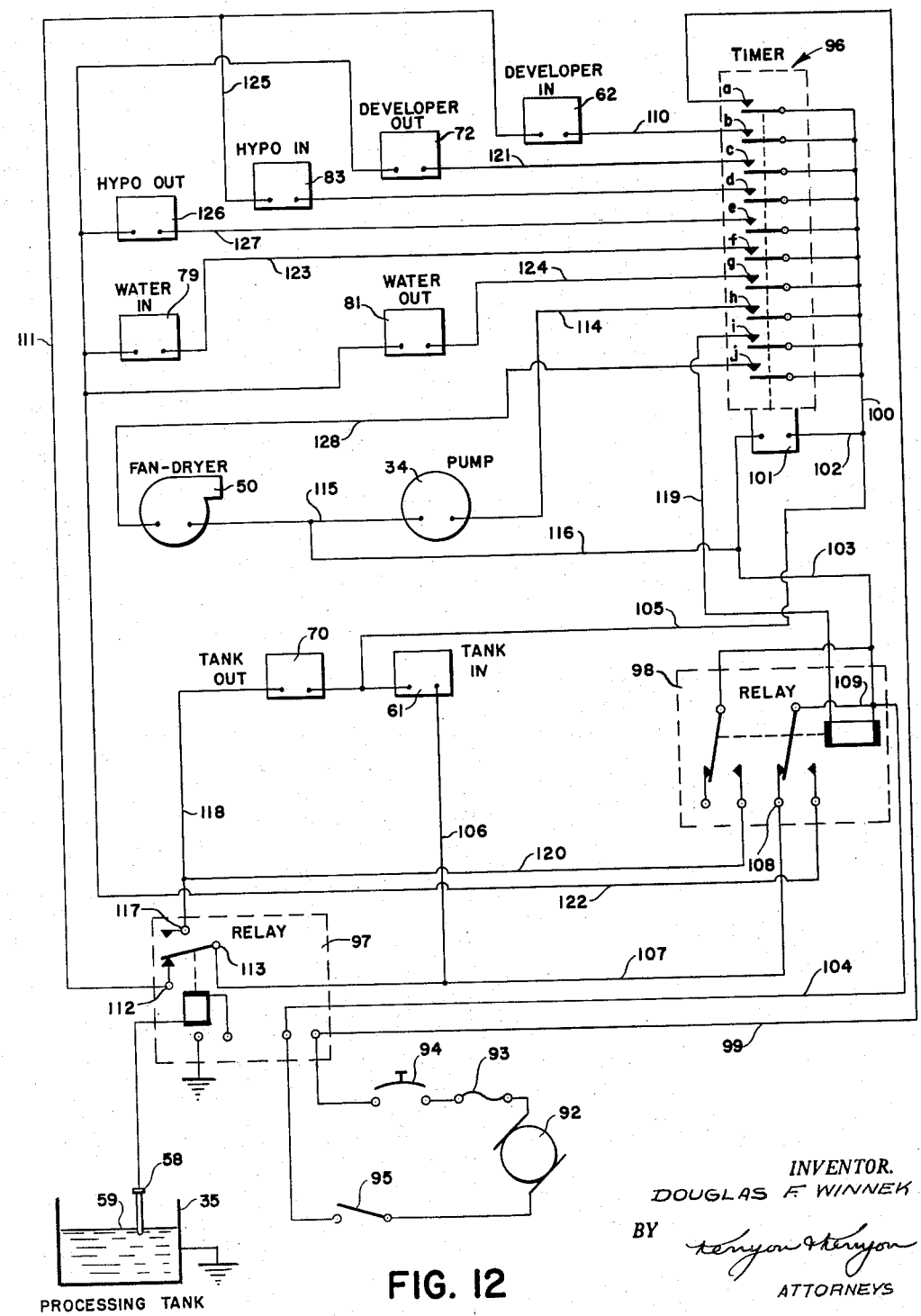
FIG. 12 is a wiring diagram for controlling the operation of the operational components of the unit shown in FIGS. 1–11.

All operational components of the apparatus are preferably controlled electrically so that the sequence of operations is entirely automatic from beginning to end and so that predetermined definite timing is observed. A circuit diagram for controlling the embodiment of this invention shown in FIGS. 1–10 is shown in FIG. 12. A typical schedule of timing for the different essential operating functions is indicated diagrammatically in FIG. 11. The circuit diagram shown in FIG. 12 will now be described in connection with a typical operational example carried out in accordance with the timing intervals as indicated in FIG. 11.

When it is desired to develop an exposed photographic element such as an X-ray film, the drawer 21 is first pulled out so as to expose the open top of the processing tank 35 and make available to the operator any hangers 36 which may be stored as in the chamber 38. The photographic element, or several of them as the case may be, each carried by its hanger, is placed in the processing tank. This operation is carried out in the dark or in the presence of some light to which the photographic element in question is not sensitive. Thereupon the drawer is closed and from this moment on there is no necesity for preserving dark room conditions outside of the cabinet.

The reservoir bottles 24 and 25 have previously been supplied with the developing solution and the fixing solution, respectively, that the operator desires to use. Since the time required for development may vary substantially as between different developers and also varies depending on temperature, the operator after noting the temperature of the developer on the thermometer scale 29 selects the developing time which is appropriate for the particular developer employed. Then all that is necessary is to set the pointer 90 at the desired developing time as indicated on the scale 91 on the timer dial 30 and, having done this, the rest of the processing is carried on automatically. On the chart indicated in FIG. 11 the developing time, as indicated in the line containing the legend "Tank In" is fifteen minutes, this being the maximum that is likely to be encountered. Actually the apparatus and method of this invention lends itself to the use of fast acting developing solutions; and the combined effect of such solutions and the efficiency with which they are used by the method and apparatus of this invention are such that the developing time may be reduced to as little as two or three minutes while still obtaining very desirable results.

Referring more particularly to FIG. 12, the electrical energy may be suplied to the apparatus from any suitable source such as that indicated at 92, which desirably is conventional 115-volt A.-C. 60 cycle power. Preferably one of the lines from the source 92 comprises the fuse means 93 and an overload circuit breaker 94. One of the lines likewise preferably comprises the drawer switch 95 which remains open unless the drawer 21 is in fully closed position. It is highly desirable that no energy be supplied to the apparatus unless the drawer 21 is closed with the processing tank in fluid-tight relation with respect to the cover 42. Moreover, it is desirable that the drawer have a latch which minimizes the possibility of accidentally opening it.

The different circuits are controlled by the timing device, which is indicated generally by reference character 96, as supplemented by the relay 97 and the double throw relay 98 which are actuated in the manner that will be described further hereinbelow.

The timer 96 comprises ten contact arm means, indicated by the reference characters a to j, respectively. These contact arms are used to make and break circuits controlled thereby in response to actuation by a motor which is comprised in the timer and which advances the arm actuating and control means comprised in the timer at suitable intervals, such as 45 seconds. Suitable timers are well known and desirably are of the rotatable multiple disc type wherein the contact arms are actuated by notches of predetermined location and angular extent in rotatable discs and wherein the pointer 90 in front of the time dial follows the rotation of the disc elements as they are turned at the expiration of each time interval through a movement which, for example, may be 5 rotational degrees.

When the apparatus is not in use none of the contact arms a to j make contact. However, when the timer is set for the desired developing period contact is established at arm a to which one of the main current supply lines 99 is connected. The line 99 is thereby connected with the gang line 100, which in turn is connected to one side of the timer motor 101 by the line 102. The other side of the timer motor is connected by the line 103 to the other principal current supply line 104 for completing the circuit through the timer motor, thereby starting its operation. As indicated in the line opposite the legend "Timer" in FIG. 11, the timer motor continues to operate throughout the rest of the cycle of operations.

The establishment of contact at contact arm a also actuates the "tank in" solenoid valve 61 to open it through the extension 105 of the gang line 100, the line 106, and the line 107 which is connected to the pole 108 of the relay 98 which is in normally closed relation with the neutral pole 109 that is connected to the feed line 104.

Simultaneously with the establishment of contact at contact arm a contact is also effected at arm b which is connected to the "developer in" solenoid valve 62 by the line 110. The circuit of the solenoid valve 62 is completed through the line 111 to the pole 112 of the relay 97. The pole 112 is in normally closed relation with the neutral pole 113 of the relay 97 which is connected to the line 107 that is in electrically connected relation with the line 104, as hereinabove described. Simultaneously with the establishment of contact at the contact arms a and b, contact is also established at the contact arm h which is connected to one side of the pump motor 34 by the line 114. The other side of the pump motor is connected to the bridge line 115 which is connected by the line 116 to the line 103 which, as aforesaid, is connected with power line 104.

It follows from the foregoing that as soon as the timer motor is started the "tank in" and the "developer in" solenoid valves are opened and the pump starts to operate, thus causing the processing tank 35 to be filled very rapidly with developing solution, the filling of the tank preferably requiring about 15 to 30 seconds, as mentioned hereinabove. As soon as the desired liquid level 59 is reached, then, as shown diagrammatically in FIG. 12, an electrical circuit is completed through the solution in the processing tank when the liquid level reaches the probe 58, thereby actuating the relay 97 so as to connect the neutral pole 113 of relay 97 with the normally open pole 117. Preferably the electrical circuit in which the liquid level probe 58 is comprised is energized at a substantially lower voltage, which may be derived by any suitable means (not shown) in relay 97. When relay 97 is actuated to connect the neutral pole 113 with the normally open pole 117 the "developer in" solenoid valve is de-energized and the "tank out" solenoid valve 70 is energized by causing the circuit to be completed between lines 105 and 107, through the line 118 and the relay 97. Under these conditions the developing solution is continuously pumped into the processing tank 35 and withdrawn therefrom at the same rate, thereby maintaining the liquid level within the processing tank and providing the essential controlled liquid turbulence of the developing solution throughout the period from initial introduction of developer; as indicated by the line of FIG. 11 bearing the legend "Tank In," this period may be fifteen minutes, depending on the initial manual setting of the timer. Upon the expiration of this period, contact is established at the contact arm i for energizing the relay 98 through the line 119, thereby breaking the circuit containing the "tank in" solenoid 61 while preserving the circuit for the "tank out" solenoid 70 through the alternative connecting line 120. Simultaneously contact is established at the contact arm c with the "developer out" solenoid valve 72, whose circuit is completed by the lines 121 and 122. Under these conditions the developer in the processing tank 35 is rapidly pumped back into the reservoir bottle 24 and as soon as the liquid level 59 falls below the probe 58 the relay 97 is actuated to its normally closed position. However, while the developer can be pumped back into the bottle 24 during an interval of about 15 to 30 seconds, a return period of about 45 seconds is provided in order to insure thorough draining of the processing tank 35, as indicated in the line opposite the legend "Dev. Out" in FIG. 11. Thereupon contact at contact arms b and c is disestablished in the lines for the "developer in" solenoid valve 62 and the "developer out" solenoid valve 72.

With the control elements otherwise remaining unchanged, contact is now established at the contact arms e and f for energizing the "water in" solenoid valve 79 and the "water out" solenoid valve 81 which are in the lines 123 and 124, respectively, that are connected with the line 122. Under these conditions the photographic elements within the processing tank are thoroughly washed with the water spray and the pump and associated lines which are common to the liquid circuits for the developing solution and fixing solution are thoroughly flushed and rinsed. This rinsing operation may be timed for a duration of 45 seconds, as indicated in the line opposite the legend "Water In" in FIG. 11, after which the contact is disestablished at the contact arm f, thereby de-energizing the "water in" solenoid. After an additional interval of 45 seconds, as indicated on the chart of FIG. 11 opposite the legend "Water Out," contact is disestablished at the contact arm e, thereby also de-energizing the "water out" solenoid valve 81.

After the conclusion of the rinsing operation contact is disestablished at the contact arm i, thereby de-energizing the relay 98 so that both arms of the double throw switch will return to their normally closed positions, one effect of which is to immediately energize the "tank in" solenoid valve 61. Simultaneously with the de-energizing of the relay 98 contact is established at contact arm d for energizing the "hypo in" solenoid valve 83 which is in the line 125 that is connected with the line 111. Under the conditions thus established the fixing solution is rapidly supplied to the processing tank 35 and when the liquid level 59 reaches the probe 58 the relay 97 is again actuated, thereby de-energizing the "hypo in" solenoid valve 83 and energizing the "tank out" solenoid valve 70 for causing the fixing solution to be circulated from the back into the processing tank 35 for maintaining turbulence therein. At the expiration of a period of seven minutes and 30 seconds from the time when the fixing solution was first introduced into the processing tank 35, as indicated in the line opposite the legend "Tank In" in FIG. 11, contact is established at the contact arm i for actuating the relay 98 to thereby de-energize the "tank in" solenoid valve 61 while the "tank out" solenoid valve 70 remains energized. Simultaneously contact is established at the contact arm e for energizing the "hypo out" solenoid valve 126 which is in line 127, thereby causing the fixing solution within the processing tank 35 to be pumped back into the reservoir bottle 25 therefor. During this period the relay 97 returns to its normally closed position.

The controls for returning the fixing solution to the reservoir bottle 25 keeps the "hypo out" solenoid valve 126 open for an additional 45 seconds, as indicated in FIG. 11 in the line opposite the legend "Hypo Out." At the expiration of this period contact is disestablished at the contact arms d and c in the lines for the "hypo in" solenoid valve 83 and the "hypo out" solenoid valve 85, respectively, and both the "water in" solenoid valve 79 and the "water out" solenoid valve 81 are energized, thus starting the washing period during which the "tank in" solenoid valve 61 remains de-energized and the "tank out" solenoid valve 70 remains energized. The washing is continued for eleven minutes, 15 seconds, and at the expiration of this period the "water in" solenoid valve is de-energized and the processing tank is permitted to thoroughly drain during the next 45 seconds, at the conclusion of which all of the solenoid valves as well as the relays and the pump 34 are de-energized.

The only remaining step is that of drying the film or other photographic element within the processing tank 35 and this is accomplished by establishing contact at the contact arm j so as to energize the fan 50 and the heating element comprised therein, the fan 50 and the heating element comprised therein being in the line 128. A drying period of twelve minutes, 45 seconds, is suitable, as indicated in FIG. 11 in the line opposite the legend "Dryer." At the expiration of this period contact at the contact arm j is disestablished, thus de-energizing the fan 50, and at the end of the next succeeding 45-second interval the contact at contact arm a is disestablished, thereby de-energizing the timer motor 101, the full processing cycle now having been completed.

After the completion of the processing cycle as aforesaid, the developed and dried films or other photographic elements are available upon opening the drawer 21 and removing them from the processing tank 35 which is comprised in the dryer.

While this invention has been described hereinabove in connection with a typical embodiment thereof and in connection with a typical example, it is to be understood that this has been done merely for illustrative purposes and that the embodiments of this invention may be varied in the practice thereof. For the purpose of further illustrating the practice of this invention, reference is made to FIG. 13, which is a flow diagram similar to that shown in FIG. 10 but utilizing different liquid circuit means for effecting the essential operational steps.

Figure 13:
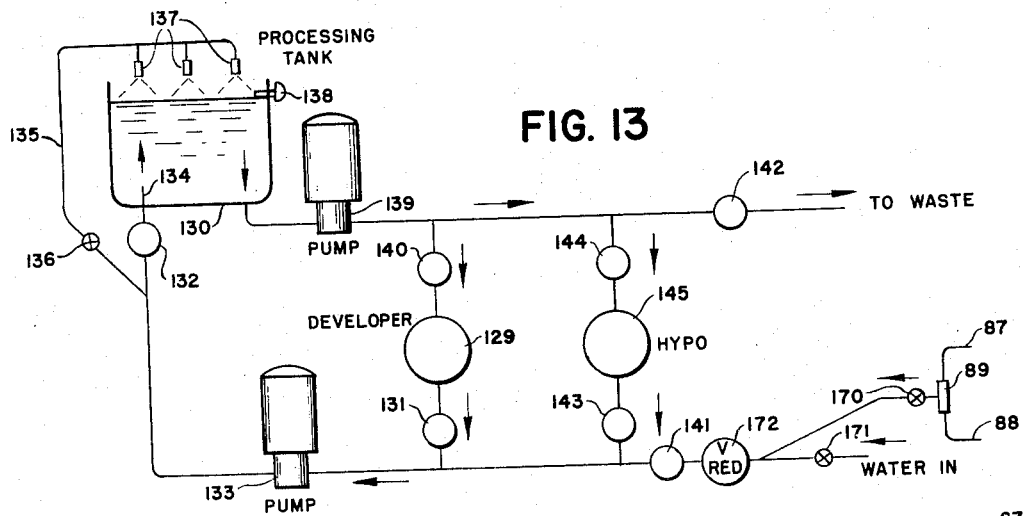
FIG. 13 is a schematic flow diagram of an alternative embodiment of this invention.

In the embodiment of this invention shown in FIG. 13 two pumps are employed which may be selectively actuated. In a typical processing cycle the first step is that of supplying developing solution from the reservoir bottle 129 for the developer solution to the processing tank 130. To accomplish this the "developer in" solenoid valve 131 and the "tank in" solenoid valve 132 are each energized to open them to establish the liquid supply conduit and at the same time the pump 133 is caused to start operating. This causes the developing solution to be fed into the tank 130 very rapidly through the inlet 134 and means is preferably provided for causing a portion of the developer solution to be directed through the line 135 controlled by the valve 136 to the spray nozzles 137. As soon as the liquid level reaches the probe 138 the pump 139 is set into operation and the "developer out" solenoid valve 140 is energized to establish the liquid return conduit. The pumps 133 and 139 have substantially the same capacity and under the conditions stated the developing solution will be circulated into the processing tank 130 and from the processing tank 130 back to the reservoir bottle 129 at substantially the same rate, thus maintaining the desired liquid level in the processing tank and maintaining the proper conditions of turbulence therein.

During the foregoing operations the other solenoid valves shown in FIG. 13 are closed and after the desired developing period has been completed the "developer in" solenoid valve 131 is closed and after an emptying period of a minute or so the "developer out" solenoid valve 140 is closed. Thereupon the "water in" solenoid valve 141 and the "water out" solenoid valve 142 are opened while the pumps 133 and 139 continue to operate, thereby causing rinsing water to circulate through the processing tank 130. It is preferable during this operation to close the "tank in" solenoid valve 132 so that the rinse water will be used more efficiently for being sprayed from the nozzles 137 onto the films or other photographic elements disposed within the processing tank 130. It is to be noted that during the water rinsing operation portions of the liquid circuits traversed by the developing solution, including both of the pumps, are thoroughly flushed with the rinsing water. In order that the portion of the liquid circuit in the region of the inlet 134 of the processing tank may be rinsed with water, the closing of the solenoid valve 132, if effected, may be delayed so as to follow by a few seconds the pumping of the rinsing water into the processing tank 130.

After the water rinsing step has been completed, then the "water in" solenoid valve is closed and a few seconds later the "water out" solenoid valve 142 is closed. At this time the "hypo in" solenoid valve 143 is opened and the fixing solution is pumped into the processing tank 130 and as soon as its level reaches the probe 138 the "hypo out" solenoid valve 144 is opened so as to establish liquid return conduit for pumping the fixing solution from the reservoir bottle 145 to the processing tank 130 and back to the reservoir bottle 145.

At the conclusion of the desired period for fixing the "hypo in" solenoid valve 143 is closed and shortly thereafter the "hypo out" solenoid valve 144 is closed, whereupon the "water in" solenoid valve 141 and the "water out" solenoid valve 142 are opened, the "tank in" solenoid valve 132 being closed a few moments thereafter so as to direct the wash water through the spray nozzles 127.

After the washing has been completed all of the solenoid valves and the pumps are de-energized and the processing cycle is completed except for final drying, which may be accomplished while the films or other photographic elements remain in the processing tank 130 as, for example, in the manner hereinabove described.

The processing tank 130 and the operating parts associated therewith, as shown in FIG. 13, may be housed in a suitable cabinet such as that described hereinabove in connection with FIGS. 1–12.

Figure 14:
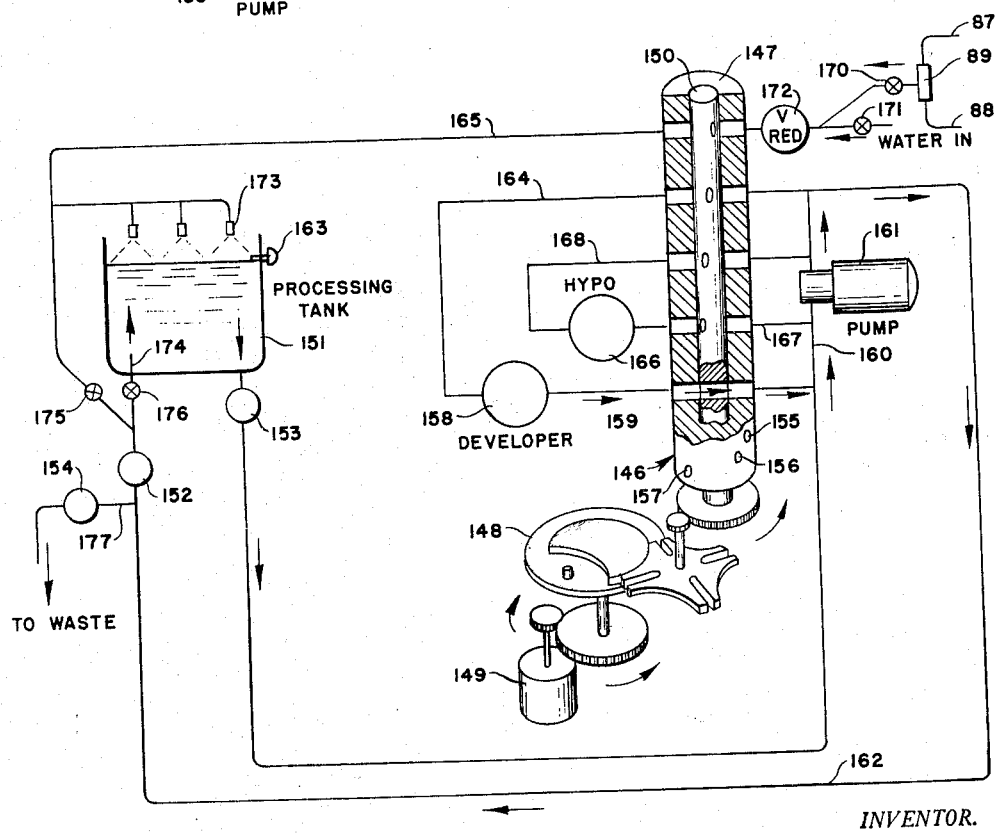
FIG. 14 is a schematic flow diagram of a further embodiment of this invention whereby fluid control is effected by mechanical valve means in that portion of the unit which is stationary, as distinguished from the portion of the unit that is movable with the movable processing tank.
Figure 18:
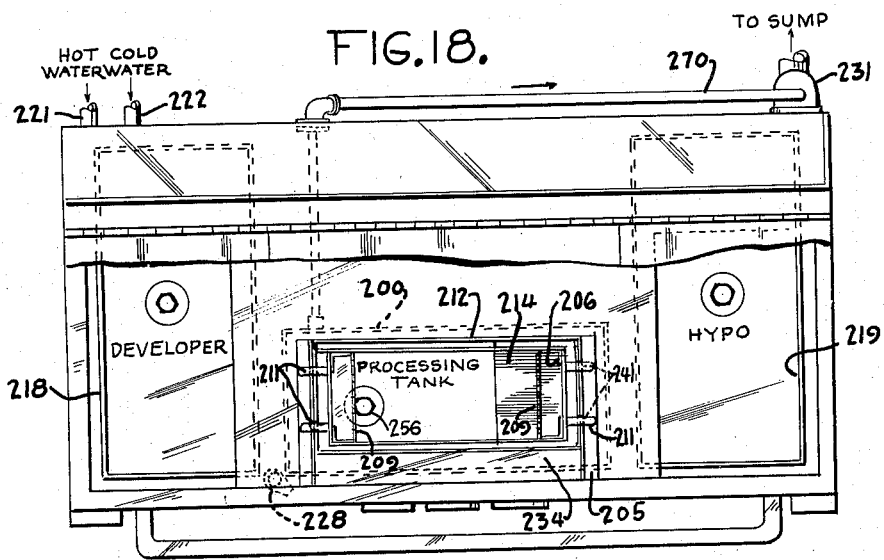
FIG. 18 is a plan view of the embodiment shown in FIG. 15 with most of the covers broken away to show the underlying parts.
Figure 19:
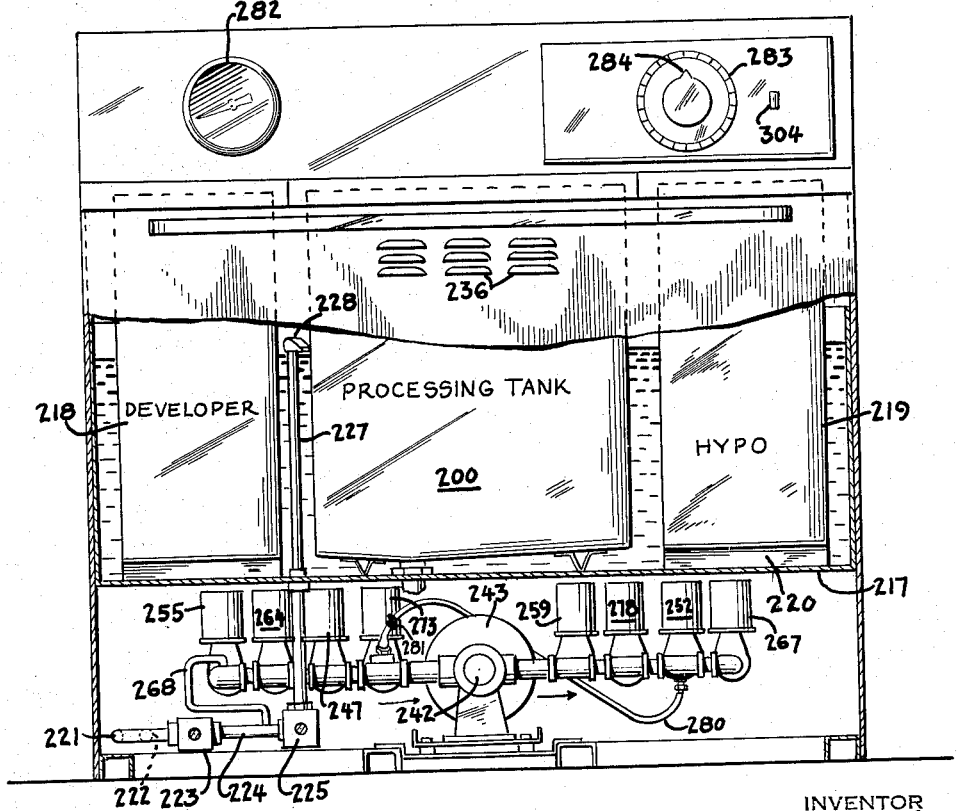
FIG. 19 is a front elevation of the embodiment shown in FIG. 15 partially broken away and with certain of the parts shown in section.
Figure 23:
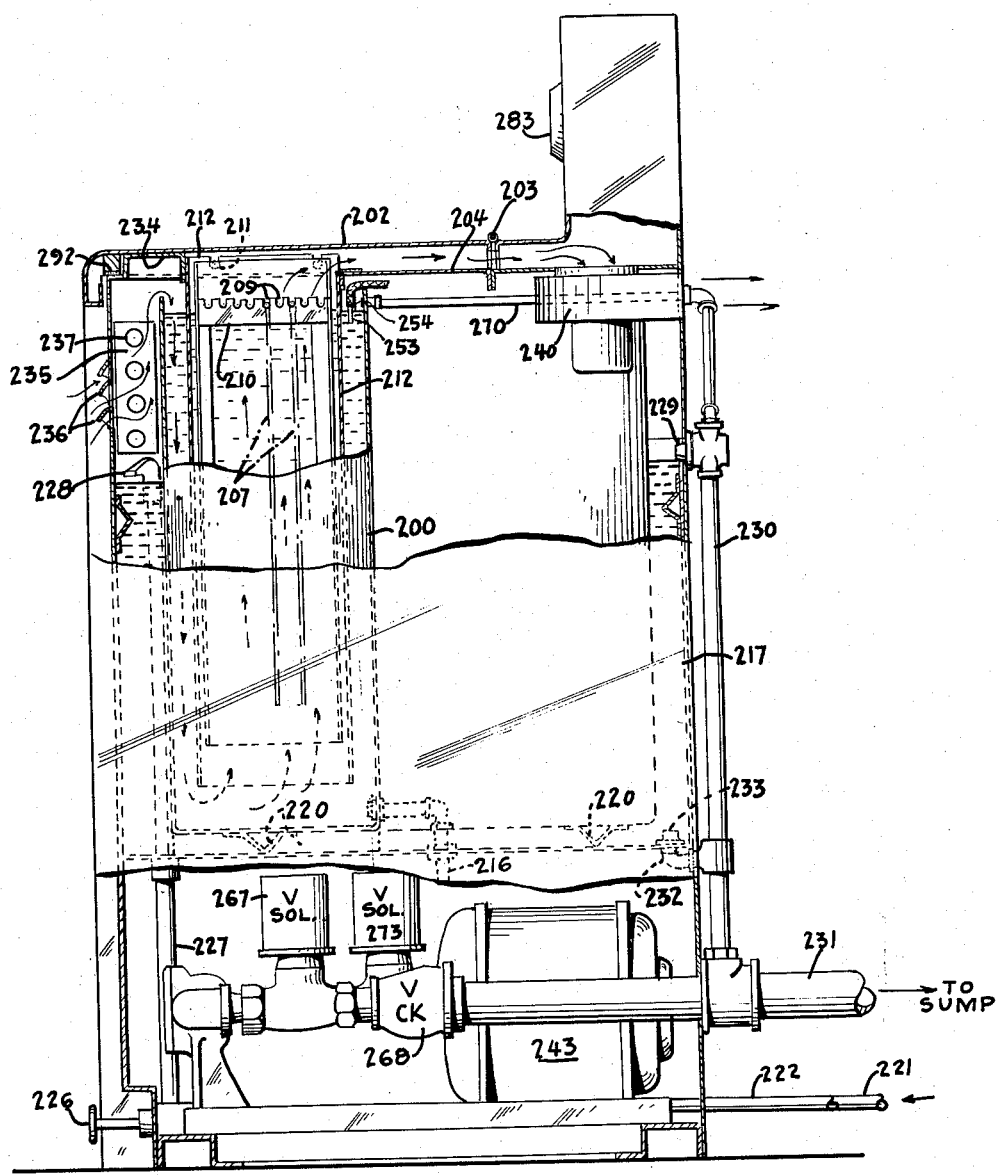
FIG. 23 is an end elevation of the embodiment shown in FIG. 15 with parts broken away and certain parts shown in section.
Figure 24:
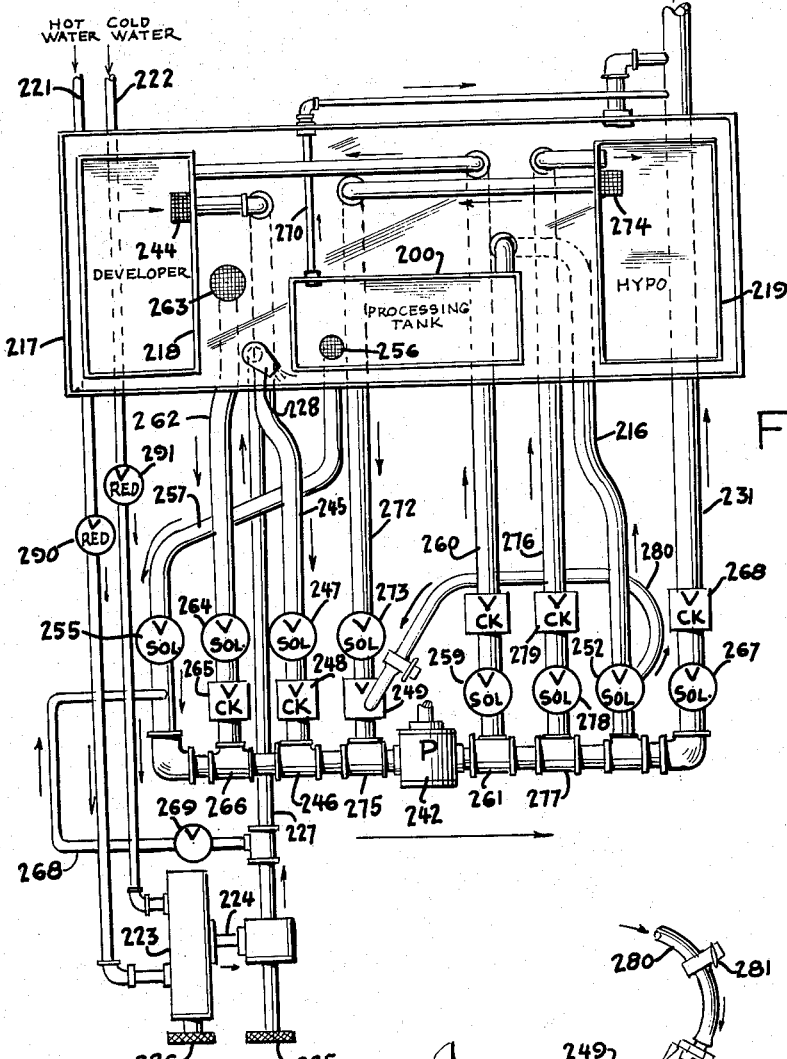
FIG. 24 is a plan view, partially diagrammatic and with the delineation of certain of parts expanded vertically, which shows more clearly the arrangement of the conduit means and valving employed.

An alternative embodiment of this invention is shown in FIG. 14, which illustrates how the liquid circuit means may be controlled by mechanical type valve means as distinguished from solenoid valve means. The mechanical valve means as well as the other components of the apparatus have been shown merely diagrammatically in FIG. 14.

The mechanical type valve means is indicated generally by the reference character 146. A ported valve sleeve 147 may be employed which is given rotational impulses through, for example, twelve different rotational positions per revolution by the actuating mechanism 148 which may be of the well-known Geneva type. The mechanism 148 is shown as operated by a suitable motor 149 which may be actuated under the control of a timing mechanism (not shown) so as to advance the rotation of the sleeve 147 through its different rotational positions at intervals of desired duration. The flow of both developing solution and fixing solution is controlled by rotation of the sleeve 147 relative to the ported stationary member 150, the flow being established whenever a port means in the member 150 is in registration with the port means in opposite walls of the sleeve 147. A fluid control valve of the type shown in FIG. 14 may be readily utilized in that part of a processing unit which remains stationary, as distinguished from the valve means more closely associated with the inlet and outlet of the processing tank 151, and which may conveniently move integrally with the processing tank when the processing tank is comprised in a drawer that is adapted to be opened and closed with reference to a cabinet type unit. More specifically, the "tank in" valve 152, the "tank out" valve 153 and the "to waste" valve 154 are shown as being of the solenoid valve type. Since these valves are opened and closed at appropriate settings of the mechanical valve means 146, the electrical circuits for the valves 152, 153 and 154 may be controlled conveniently by contacts associated with the rotating sleeve 147, e.g., contacts such as the contacts 155, 156, 157, which may be brought into connecting relation with suitable cooperating contact elements of circuits (not shown) that control the energizing and de-energizing of the solenoid valves 152, 153 and 154.

When the device is not in use the valve 146 may be in a first position wherein none of the liquid circuits is completed. To start the processing cycle, the parts are first brought to the position shown in FIG. 14 wherein the valve 146 is in a second position which establishes the fluid circuit for the developing solution from the reservoir bottle 158 through the line 159 to the line 160 that is on the inlet side of the pump 161 that has been placed in operation. At the same time the "tank in" solenoid valve 152 is opened and the developing solution is pumped through the line 162 so as to flow into the processing tank 151 and be admitted both at the tank inlet 174 and the spray nozzles 173 in relative inoperation depending on the setting of the valves 175 and 176. As soon as the liquid level in the processing tank 151 reaches the probe 163, the valve 146 is given a rotational impulse to a third position which disestablishes the liquid circuit through the valve 146 while at the same time energizing the "tank out" solenoid valve 153 so that continued operation of the pump 161 will circulate the developing fluid through the processing tank for maintaining the desired turbulence therein. As soon as the desired period of development has been substantially completed the valve 147 is given another rotational impulse to a fourth position which establishes the fluid circuit through the line 164 and de-energizes the "tank in" solenoid 152, thereby causing the developing solution in the processing tank 151 to be returned to the reservoir bottle 158 by the action of the pump 161.

Further rotational impulse of the valve 146 to a fifth position establishes the liquid circuit in the water inlet line 165, the "tank out" solenoid valve 153 and the "to waste" solenoid valve 154 being energized to open them at the same time so as to cause the wash water to be admitted through the spray nozzles 173 as well as through the inlet 174 and simultaneously pumped out of the processing tank 151 and thence out of the apparatus via the lines 160, 162 and 177. It is to be noted that during this rinsing step the wash water flushes out the entire system previously traversed by the developing solution.

A further rotational impulse of the valve 146 to a sixth position serves to disconnect the water inlet line 165 while the "tank out" solenoid valve 153 and the "to waste" solenoid valve 154 remain open.

After the rinse has been completed following the empolyment of the developing solution, the steps utilized in connection with the developing solution are repeated except that the solution which is used is the fixing solution contained in the reservoir bottle 166, namely, the fixing solution is first pumped out of the bottle 166 through the line 167 so as to be pumped into the processing tank 151 when the valve 146 is in a seventh position, the fixing solution is then circulated during the desired period required for fixing when the valve 146 is in an eighth position, and fixing solution is lastly returned to the reservoir bottle 166 through the line 168 when the valve 146 is in a ninth position. The final washing step is then accomplished in the manner hereinabove described in connection with the rinsing step when the valve 146 is in tenth and eleventh positions. At this time the pump 161 may be de-energized and a fan energized for blowing warm air through the processing tank as by turning valve 146 to a twelfth position; and when the drying has been completed the valve 146 may then be turned to the original off position.

Hereinabove this invention has been described in connection with a unit in which the processing tank is comprised in a drawer of a suitable cabinet and the "tank in" and "to waste" solenoid valves are located in line means that moves integrally with the drawer and, while this is considered to be preferable, nevertheless these solenoid valves could be mounted in fixed position and utilize a flexible hose between the "tank in" solenoid valve and the inlet of the processing tank. When these valves are thus mounted in fixed position it is apparent the valves 152, 153 and 154 of FIG. 14 may be comprised in the mechanical valve 146.

The embodiments of this invention which have been shown and described hereinabove have comprised a suitable cabinet in which provision is made for reservoir bottles which, according to the example given hereinabove, may be adapted to hold about five gallons of developing solution and fixing solution, respectively. It is not necessary, however, for these bottle reservoirs to be housed within the cabinet. If desired, the cabinet may be reduced to still smaller size by omitting that portion immediately behind the access doors 23 and by placing the reservoir bottles in some other location as, for example, in an adjoining service room where the bottle reservoirs may be disconnected from suitable hose connections and replaced without the necessity for entering the room wherein the processing actually takes place. Whether or not the reservoir bottles are housed within the same cabinet which contains the rest of the apparatus, the reservoir bottles may have connections with the hoses connected thereto by readily releasable connection means so as to facilitate replacement of the reservoir bottles from time to time whenever needed.

Particularly when the processing unit is made up so that the reservoir bottle means is not within the same cabinet as the rest of the apparatus, common reservoir bottle means may be used for supplying a plurality of processing units which may, for example, be arranged in a battery, thereby providing very large processing capacity while requiring a minimum of floor space.

While it is regarded as preferable that the processing tank be comprised in a movable drawer, it is not necessary that this be the case. For example, the processing tank may be in fixed relation to the rest of the apparatus and merely provided with a cover that is removable for providing access to the processing tank.

While it is normally advantageous to complete a processing cycle which has once been started, nevertheless the apparatus of this invention is such that the operational cycle may be interrupted at any time and, if desired, a film that is being processed may be examined in ordinary light at any time after the development has continued to a point at which the film is no longer excessively sensitive to light and all that is required in any such case is to open the drawer or otherwise remove the cover from the processing tank, thereby making accessible the hanger for the film to be inspected. Alternatively, if dark room illumination is employed the films may be removed at any time for inspection. Such removal may be desirable under special circumstances as, for example, when several films or other photographic elements are being processed which for proper development may require substantially different developing times. In such case, if the development of one film has been completed while others require additional development, the film whose development has been completed may be removed and placed in a bath of short stop until the development of the film requiring the longest developing period has been completed. At that time any of the films which have been placed in the bath of short stop may be replaced in the processing tank so as to undergo the rest of the steps involved in the complete process. In this connection it may be mentioned that for operations of this type one of the chambers 38 or 39 comprised in the drawer 21 may be conveniently used for a bath of short stop solution.

By use of the spray nozzles, such as the spray nozzles employed in the embodiment of this invention shown in FIGS. 1–12, one is enabled to contact the entire area of a film or other exposed element to be developed at substantially the same instant substantially uniformly throughout. Consequently all parts of the photographic element are developed for substantially the identical period of time. If the spray nozzles are not employed, then during the initial period when the processing tank is being filled with developing solution the lower portion of the film is subjected to the action of the developing solution while the upper portion is not and the lower portion is developed for a slightly longer period than the upper portion of the film to the extent of the time required to fill the processing tank, namely, a period of the order of 15 to 30 seconds. In actual practice using conventional developing solutions requiring upwards of three or four minutes for development no appreciable lack of uniformity may be noted under the conditions mentioned if the spray nozzles are not employed during the period when the processing tank is being filled. The use of the spray nozzles becomes more important in connection with the developing period when a very rapid developer is used which effects the development in a very short period such as one or two minutes. However, even in such case an equalization of developing time can be substantially accomplished by omitting the use of the spray nozzles not only in connection with the developer but also in connection with the rinsing solution, for in such case if the rinsing solution is introduced into the processing tank at substantially the same rate that the developing solution is introduced, thereby filling the processing tank to the liquid level determined by the probe at the same rate that the filling step was accomplished in the case of the developer, the period during which the developing solution is in contact with the film or other photographic element will be substantially the same in both the lower and upper portions of the processing tank.

In the event that the spray nozzles are not employed in any of the processing steps the apparatus may be utilized without any cover for the processing tank if throughout the developing period the operation is carried out utilizing a safe light or other dark room type of illumination. Equalization of development period for all parts of a film or other photographic element may also be provided by using hangers mounted for rotation about a central axis perpendicular to the hanger planes and causing the hangers to be rotated about the axis while in contact with the developing solution. Thus if at the conclusion of the developing step the hangers are in position rotated 180° from their position when the developing step was instituted the films or other photographic elements carried by the hangers will be in contact with the turbulent developing solution for the same interval of time throughout all portions thereof.

Further features and improvements pertain to the alternative embodiment of this invention which is shown and described in connection with FIGS. 15 to 27. According to this embodiment, the processing tank 200 is disposed in fixed relation to the cabinet 201 and is accessible by raising the cover 202 to the position shown in FIG. 16, the cover being hinged at 203. Underneath the cover 202 there is a tray 204 having an opening therein to provide access to the processing tank for receiving the element holding rack 206 which can be lowered into the processing tank together with one or more exposed photographic elements such as exposed X-ray films or plates 207. Each of the elements 207 may be hung by suitable clips from a hanger 208; and for maintaining the hangers 208 in the proper position there are notches 209 in the cross members 210 at each end of the element holding rack 206. The rack 206 is suspended in the processing tank by the handles 211 which also are adapted to be grasped for lifting the rack from the processing tank.

Removably suspended within the processing tank 200 by means of the brackets 213 there is disposed the baffle 212 which extends downwardly from above the level of the tray 204 into adjacent spaced relation to the bottom of the processing tank 200. The side walls of the baffle 212 are in generally equi-spaced parallel relation to the side walls of the processing tank, leaving a continuous space between the baffle 212 and the side walls of the processing tank 200. The baffle is open at the bottom except for the horizontally disposed plate 214 which is adjacent the region of the inlet 215 near the bottom of the processing tank 200. When liquid is injected into the processing tank 200 through the inlet line 216 that terminates in the inlet 215, the liquid in the processing tank takes on a swirling motion, the outside perimeter of the swirling liquid being outside the baffle 212 while the liquid within the baffle 212 takes on a smooth movement whereby liquid turbulence is provided without tending to cause undue movement of the exposed photographic elements suspended in the processing tank.

The flange members 205 are secured as by welding to the tray 204 so as to be alongside the end walls of the baffle 212. Secured to the front of the baffle there is the inverted trough-shaped part 234 which extends over the forward portion of the opening in the tray 204 that overlies the air-receiving chamber 235 in the upper front portion of the cabinet 201. Air is admissible into chamber 235 through the louvres 236 and may be warmed therein by passage in contact with the heating elements 237. After having been heated by elements 237 the air is directed by the part 234 into the space between the baffle 212 and the inner surface of side walls of the processing tank 200 and, if there is no liquid in the processing tank, the air travels to the bottom of the baffle 212 and thence upwardly inside the baffle 212 for drying processed elements suspended therein. The back of the baffle 212 is open above the tray 204 so that air can be removed through the passage between the tray 204 and the underside of the cover 202 to the fan 240 and thence out of the back of the cabinet. This means for bringing a current of warm air into contact with elements in the processing tank after they have been processed may optionally be employed in the practice of this invention. The notches 241 in the top of the end walls of the baffle 212 and of the flanges 205 accommodate the handles 211 for positioning the element holding rack 206 within the baffle 212.

The entire interior of the upper portion of the cabinet 201 is occupied by the climatizing tank 217, whose side walls encompass not only the processing tank 200 but also the reservoir 218 for the developer solution and the reservoir 219 for the fixing solution. The processing tank 200 and the reservoirs 218 and 219 are spaced from the bottom of the climatizing tank 217 by the spacer feet 220 with the result that the liquid contents of the reservoirs 218 and 219 and of the processing tank 200 are in indirect heat exchange relation substantially throughout most of the side walls and the bottoms thereof with liquid contained in the climatizing tank.

The liquid in the climatizing tank is the liquid used for washing the elements and normally, of course, this liquid is water. It is desirable to maintain the liquid in the climatizing tank 217 at a constant temperature, such as 68° F. While this may be accomplished by thermostatic control responsive to temperature change of the liquid in the climatizing tank itself, together with suitable means for adding or taking away heat from the liquid in the processing tank, the temperature of the liquid in the processing tank is preferably held constant by causing the wash water to flow into the climatizing tank continuously and always at substantially the same temperature, there being an outflow of liquid from the climatizing tank roughly corresponding to the amount of water which is constantly added at the temperature to be maintained.

In order to have the water at a constant temperature, the unit is connected to sources of water at different temperatures, one being cold water and the other being hot water. The hot water is admitted from a suitable source through the line 221 and the cold water is admitted from a suitable source through the line 222 to the mixing device 223 which is set to provide an outflow through the line 224 at a constant temperature, such as 68° F., with a tolerance of about ¼° from this temperature. Such mixing devices are well known and usually are operable responsive to a pressure differential and a temperature differential as between the supplies of hot and cold water. The rate of flow into the climatizing tank 217 may be controlled by the hand valve 225 which, if desired, may be available on the exterior of the cabinet 201, as shown in FIG. 15. Preferably, for improved control, pressure reducing valves 290 and 291 are employed in the lines 221 and 222, respectively. The temperature of the water supplied to the climatizing tank may be adjusted by the manually actuated adjusting handle 226.

The water at the desired control temperature is introduced into the climatizing tank by the line 227, for example at the rate of about 5 gallons per minute, which preferably terminates above the normal liquid level maintained in the climatizing tank, there being a baffle part 228 at the outlet at the upper end of the line 227, which baffle projects the incoming water downwardly so as to create currents in the climatizing tank for maintaining all parts of the water in the climatizing tank at substantially the same temperature. Termination of the line 227 above the normal level maintained in the climatizing tank also is desirable in that any possibility of suction of water back into the line 227 is effectively prevented.

The normal liquid level in the climatizing tank 217 is determined by the overflow outlet 229 through which water flows out of the climatizing tank into the line 230 which leads down to the drain line 231 connected to a suitable sump. During normal usage incoming water is fed constantly and a corresponding amount of water flows out through the overflow outlet 229 except for such water as is pumped into the processing tank for washing purposes during the processing cycles. Desirably a drainage outlet 232 is provided at the bottom of the climatizing tank 217 which is closed by a removable plug 233. The outlet 232 leads into the line 230 so that whenever it may be desired to completely drain the water from the processing tank this may be readily accomplished by removal of the plug 233.

The filling and emptying of the processing tank with the developer solution and with fixing solution and likewise with washing liquid is effected by the action of the pump 242 which is driven by a motor 243. By suitable valve controlled conduits and means for effecting automatic actuation of the valves therein, the processing tank, which, for example, contains about five gallons of liquid when the liquid is at normal liquid level, may be rapidly filled to the desired liquid level, the filling step being followed by a period of controlled liquid turbulence effected by simultaneous introduction and withdrawal of liquid at substantially the same rates, and by final withdrawal of all liquid from the tank. These operations are carried out successively for the developer solution, wash water taken from the climatizing tank, fixing solution and finally wash water again taken from the climatizing tank. The liquid conduits employed and pump capacity are such that the processing tank may be filled and emptied in only a few seconds' time, such as about 10 seconds. In this embodiment the conduits preferably are about one inch in internal diameter. The conduits which are utilized are connected to manifolds on the suction and high pressure sides of the pump, as will be described more fully below.

The developing solution from the reservoir 218 may be removed therefrom through the screen covered outlet 244 and directed by the conduit 245 to the connection 246 that is comprised in the manifold means on the suction side of the pump 242. The conduit 245 is controlled by the "developer in" solenoid valve 247. Between the solenoid valve 247 and the connection 246 there is a swing gate check valve 248 which is immediately adjacent the connection 246.

Figure 25:
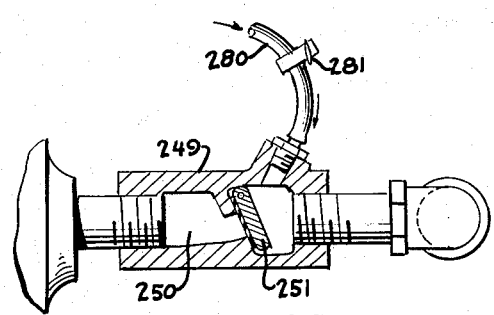
FIG. 25 is an enlarged elevation that is partly in section of one of the swing gate check valves employed, the swing gate check valve having one end of the by-pass line communicating therewith.

The swing gate check valve 248 is of the same construction as the swing gate check valve 249 that is shown in larger scale in FIG. 25. The passage 250 in the valve 249 is controlled by the swing gate 251 which permits fluid to flow in one direction while providing a positive closure for preventing flow in the opposite direction. It is one of the features of preferred practice of this invention to provide a swing gate check valve, such as shown in FIG. 25, immediately adjacent the manifold means on the suction side of the pump and so as to be between the pump and the solenoid valve for controlling each of the conduits not only for the developing solution but also the fixing solution and the washing liquid. Similarly constructed swing gate check valves are employed in the conduits connected on the high pressure side of the pump 242 and between the processing tank and the solenoid valves for controlling the return conduits for the developing and fixing solutions and for the line leading to the sump. By the provision of such swing gate check valves the operation of the solenoid valves for effecting a sharper cut off is substantially improved. Moreover, any possibility of undesired return flow is effectively prevented.

When the "developer in" solenoid valve 255 is opened the developer solution is rapidly pumped into the processing tank through the inlet conduit 216 that has been referred to above and that is controlled by the "tank in" solenoid valve 252. The introduction of the developer solution into the processing tank is continued until the liquid level reaches the probe 253, the normal liquid level being indicated at 254 in FIG. 23. As soon as the liquid level reaches the probe 253, the "developer in" solenoid valve 255 is closed and the "tank out" solenoid valve 255 is opened, whereupon the developing solution is removed from the processing tank 200 through the outlet 256 and the conduit 257 at the same rate that the developing solution is pumped in, the conduit 257 being connected to the extreme left end of the manifold on the suction side of the pump 242 at the connection 258. In the manner that has been previously described, turbulence of the developer solution in the processing tank may be maintained for as long a period as desired. When it is desired to return the developer solution to the reservoir 217, the "tank in" solenoid 252 is closed and the "developer out" solenoid valve 259 is opened, whereupon the developer solution is returned to the developer solution reservoir 218 through the conduit 260 which is connected to the manifold on the high pressure side of the pump 242 at the connection 261. In this as well as the succeeding operations the valve timing is such that after liquid removal air is sucked from the processing tank for a substantial time interval by and through the pump 242, thereby thoroughly purging the conduits traversed and the pump of droplets or other residual liquid.

In this embodiment the processing tank is filled with wash water taken from the climatizing tank 217. This is accomplished through the conduit 262 which has a screen 263 on the inlet end thereof and which is controlled by the "water in" solenoid valve 264 and the swing gate check valve 265, the conduit 262 being connected to the manifold on the suction side of the pump at the connection 266. The processing tank is filled with the wash water pumped through the conduit 216 and as soon as the predetermined liquid level is attained the "water in" solenoid valve is closed and the "tank out" solenoid valve 255 is opened so as to maintain circulation of the wash water and turbulence of the wash water in the processing tank. When the washing period is finished, the "tank in" solenoid valve 252 is closed and the "water out" solenoid valve 267 is opened, whereupon the wash liquid is pumped out of the processing tank through the line 231 which leads to the sump and which has the swing gate check valve 268 therein.

During the period of turbulence of the wash water in the processing tank after the normal liquid level has been attained an additional quantity of wash water is introduced while the water in the processing tank is being circulated through the liquid circulating conduit means comprising the tank outlet conduit 257, the tank inlet conduit 261 and the manifolds adjacent the pump 242. Additional water may be supplied in any suitable way. In the embodiment shown additional water at the desired controlled temperature is taken from the line 227 through the conduit 268 to the conduit 257 on the suction side of the pump 242. The conduit 268 contains the solenoid valve 269, which is controlled so as to be open only during the period of turbulence beginning when the processing tank becomes filled to the normal liquid level with wash water and ending when the recirculation of wash water into the processing tank is discontinued with resultant emptying of the processing tank. If desired, the additional water may be introduced into the processing tank at any other point in the liquid circulating conduit tank or into the processing tank itself. The amount of flow through the line 268 is relatively small as, for example, at the rate of about 0.5 gallon per minute. Most of the additional wash water thus introduced overflows from the processing tank through the overflow line 270 for discharge into the sump lines 230 and 231.

The supply of additional water and the overflow from the processing tank during the washing period is a significant feature of this invention in that more effective washing is accomplished together with a floating off of any particles which may have inadvertently become introduced into the liquids used. In order to permit the floating off or such particles from the interior of the baffle 212, the end wall of the baffle 212 has a slot 271 therein, as shown most clearly in FIG. 21, the slot 271 being at substantially the same level as the mouth of the outlet line 270 so that any floating particles will be carried through the opening 271 by liquid flowing toward the mouth of the overflow line 270.

After the washing period is completed, the solenoid valves 252 and 269 are closed and the water is pumped out of the processing tank into the sump. When this has been completed, the fixing solution from the tank 219 is pumped from the tank 219 through the conduit 272, which is controlled by the "hypo in" solenoid valve 273 and the swing gate check valve 249. At the inlet of the line 272 there is the strainer 274 and the line 272 terminates in the connection 275 in the manifold on the suction side of the pump 242. As soon as the predetermined normal liquid level is attained, the "hypo in" solenoid valve 273 closes and the "tank out" solenoid valve 255 is opened so as to complete the liquid circulating conduit through which the fixing solution is pumped for maintaining turbulence in the processing tank. After the desired period of contact of the fixing solution with the exposed photographic elements in the processing tank, the fixing solution is returned to the reservoir 219 utilizing the conduit 276 which is connected to the manifold on the outlet side of the pump 242 by the connection 277 and which is controlled by the "hypo out" solenoid valve 278 and the swing gate check valve 279.

After the return of the fixing solution from the processing tank 200 to the reservoir 219, the washing cycle hereinabove described is repeated. After the final washing has been completed, then the photographic elements may be removed for drying. However, unless the apparatus is immediately needed for further processing additional photographic elements, the photographic elements may be dried while they remain in the processing tank by supplying heat, e.g. electrical energy, to the heating elements 237 while at the same time actuating the fan 240 so as to cause a current of warm air to pass through the processing tank in contact with the surfaces of the elements suspended in the tank.

One of the features of this invention resides in the utilization of common conduit means and pump means for handling both the developer solution, the fixing solution and the wash water and this objective has been attained while at the same time there is a minimum of waste or dilution or contamination of the developer and fixing solutions. One factor which contributes to this objective is the utilization of the swing gate check valves in addition to the solenoid valves as has been described hereinabove. Another factor resides in the manner that the different lines which are utilized are disposed as regards their connections which are arranged in manifolds on both sides of the pump. The location of the valves for controlling the lines close to the manifold connections likewise is important. The lines on the suction side of the pump 242 are effectively drained by the action of the pump when the processing tank is drained, but it is important that the connection 266 for the "water in" conduit be disposed between the "tank out" solenoid valve 255 and the connections 246 and 275 for the "developer solution in" and "fixing solution in" lines 245 and 272, respectively.

Figure 26:
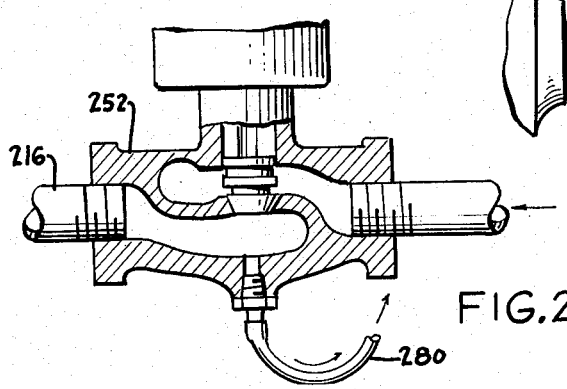
FIG. 26 is an enlarged sectional elevation partially in section of one of the solenoid valves employed, the solenoid valve having in communication therewith the other end of the by-pass line shown in FIG. 24.

On the high pressure side of the pump 242 the connections 261 and 277 for the return conduits 260 and 276 which lead, respectively, to the developer solution reservoir 218 and the fixing solution reservoir 219 are immediately adjacent the pump 242. It is a feature of this invention that the entrapment of solution in the "tank in" line 216 is prevented by utilizing the suction by-pass line 280 which extends from the bottom of the solenoid valve 252 as shown in FIG. 26 to the suction side of the swing gate check valve 249, as shown in FIG. 25. The line 280 is a small diameter line and may, for example, be in the form of a rubber tube about ⅛" in internal diameter. The internal diameter of the line 280 is such that the line 216 will be drained during a period corresponding, roughly, to the period during which the processing tank 200 is drained through the conduit 257 under the influence of the pump 242. The internal diameter of the line 280 is kept small so that an excessive amount of air will not be by-passed to the pump with resultant diminution of the suction exerted in pumping liquid from the processing tank 200 through the line 257. So that the internal diameter of the line 280 may be adjusted, if desired, a C-clamp 281 may be provided or any other means for adjusting the amount of flow through the by-pass line 280. The by-pass line 280 is preferably taken from the line 216 in as close proximity as possible to the solenoid valve 252 so that the drainage from the line 216 will be as complete as possible. On the other hand, the line 280 may be connected to the suction side of the pump 242 at whatever location is regarded as the most convenient.

The unit shown in FIGS. 15 to 26 may be provided with a suitable temperature indicator 282 for indicating the temperature of the water in the climatizing tank 217.

As in the embodiment of this invention shown in FIGS. 1 to 12, the sequence of operations may be automatically controlled by a timing device whose dial 283 is available to an operator for manual setting. Inasmuch as the embodiment shown in FIGS. 15 to 26 is substantially different in operational control from the embodiment shown in FIGS. 1 to 12, a circuit diagram suitable for effecting automatic control in performing the above described operations has been shown in FIG. 27

Figure 27:
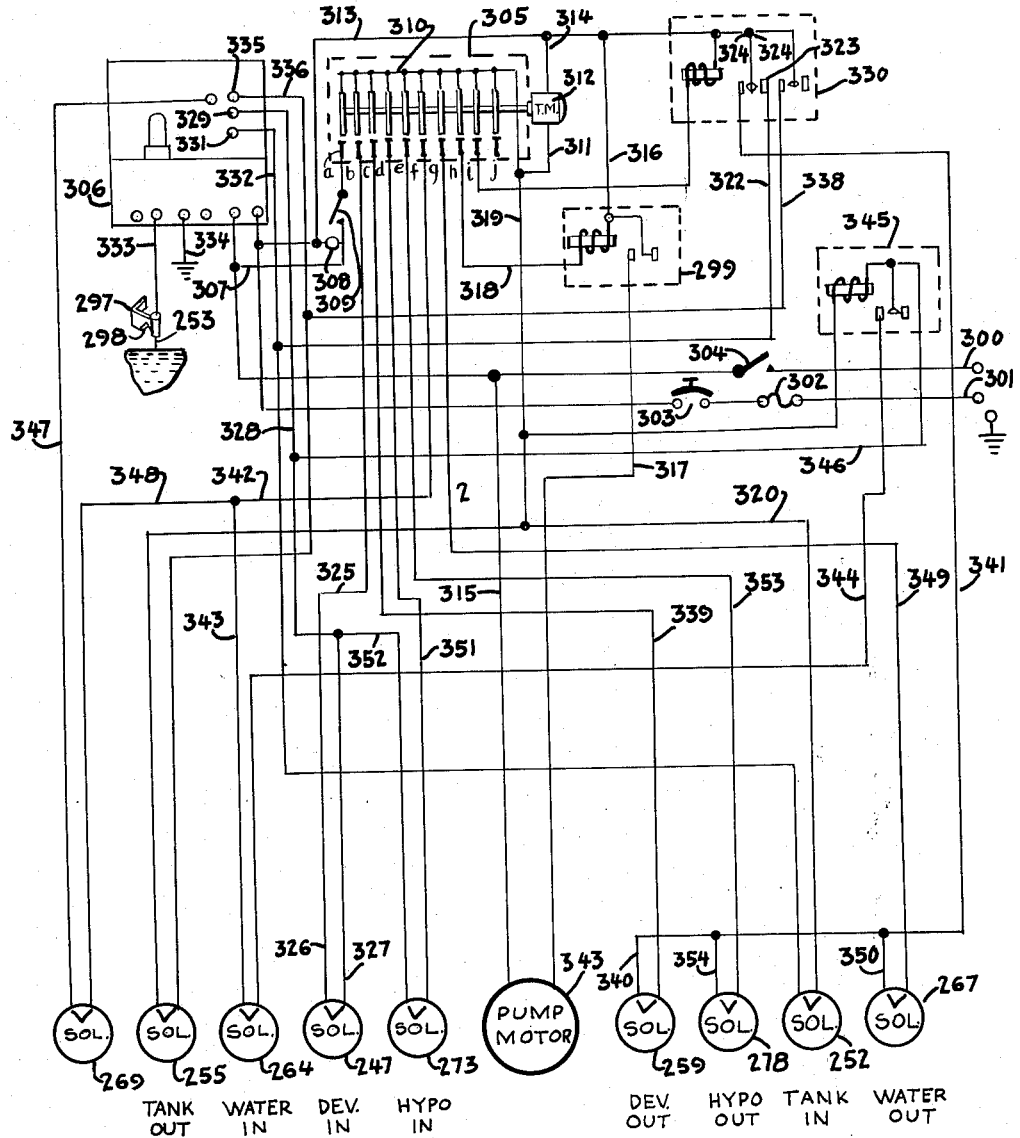
FIG. 27 is the wiring diagram for effecting automatic actuation of the embodiment shown in FIGS. 15 to 26 through its sequence of operations.

Referring to FIG. 27, the wiring diagram comprises the lines 300 and 301 connected to a suitable source of electric energy such as 115 volt A.-C. 60 cycle power. The line 301 is shown as containing fuse means 302, an overload circuit breaker 303 and the line 300 is shown as containing the master switch 304.

The timer is indicated generally by the reference character 305 and comprises the ten contact arms means *a* to *j* which coact with the disc elements, which are turned 5 rotational degrees at every interval of 45 seconds.

Line 301 leads the relay 306 and the branch line 307 is connected to one side of the pilot light 308 and through the timer switch 309 and the contact arm *a* to the gang line 310 which is continued by line 311 to one side of the timer motor 312. The line 300 also is connected to the relay 306, and the branch line 313 is connected to the other side of the pilot light 308 and, by line 314, to the other side of the timer motor 312. Establishment of contact arm *a*, as when the operator sets the pointer 284 to the particular period of development desired, serves to start the operation of the timer motor 312 which continues to turn until the operational cycle is completed.

The line 300 is connected to the pump motor 243 by the line 315 and the line 313 is connected to the pump motor 243 by the lines 316 and 317 between which there is the normally open relay 299 which is closed by completing the circuit through line 318 by establishing contact at arm *h*, such contact being effected simultaneously with establishment of contact at arm *a*.

The establishment of contact at contact arm *a* also actuates the "tank in" solenoid valve 252 to open it through the extension 319 of the gang line 310, the connecting line 320, the line 321 and the line 322 which is connected to the pole 323 of the double throw relay 330 that is in normally closed relation with the neutral pole 324 that is connected to the feed line 313.

Likewise simultaneously with establishment of contact at contact arm *a*, contact is established at contact arm *b*, thereby opening the "developer in" solenoid valve 247 through line 325, line 327 and line 328 which is connected to the pole 329 of the relay 306 that is normally in contact with the neutral pole 331 that is connected to the pole 323 of relay 330 by the line 332 and the aforesaid line 322.

Under the conditions thus far described developer solution is pumped from the reservoir 218 into the processing tank 200 until the liquid level in the processing tank 200 reaches the probe 253 to complete the low low voltage circuit between the probe line 333 and the ground line 334 that are connected to the relay 306. When the liquid level reaches the probe 253, the neutral pole 331 becomes switched to connect with the pole 335 whereby the "developer in" solenoid valve 247 closes and the "tank out" solenoid valve 255 becomes opened by completing the circuit through lines 336, 337 and 319. Under these conditions the developer solution is circulated through the liquid circulating conduit means with resultant production of controlled turbulence within the processing tank 200. The probe is carried by an arm 297 carried by the baffle 212, and its action in breaking circuit upon lowering liquid level is improved by providing the notch 298 in the underside of the arm 297.

Upon the expiration of a predetermined interval for effecting development of the exposed photographic element, contact is established at the contact arm *i* for energizing the relay 330, thereby breaking the circuit containing the "tank in" solenoid valve 252 while holding the "tank out" solenoid valve 255 open through the alternative connecting line 338. Simultaneously contact is established at the contact arm *c* so as to energize the "developer out" solenoid valve 259, whose circuit is completed by the lines 339, 340 and 341. During the succeeding 45 second interval the developer solution is returned to the reservoir 218 and the processing tank 200 is thoroughly drained, whereupon the contacts at contact arms *b* and *c* are disestablished, thus closing the solenoid valves 255 and 259 in the conduits leading to the reservoir 218 for the developer solution. Simultaneously contact is disestablished at contact arm *i* so as to effect the reopening of the "tank in" solenoid valve 252. Simultaneously, also, contact is established at contact *f*, thereby opening the "water in" solenoid valve 264 through lines 342, 343 and 344, the relay 345, and the line 346 which connects with the line 328 that is energized when the liquid in the processing tank is below the level of the probe 253, the relay 345 being closed when the line 328 is thus energized. When the liquid level as determined by the probe 253 is attained, the line 328 is de-energized, thereby closing the "water in" solenoid valve 264 and the line 236 is energized, thereby opening the "tank out" solenoid valve. Since the "tank in" solenoid valve 252 remains open, the wash water is circulated through the liquid circulating conduit means for the desired washing period.

When the line 336 is energized, the line 347 is simultaneously energized by the action of the relay 306, thereby causing the opening of the solenoid valve 269 in the auxiliary water supply conduit 268, the circuit to line 342 leading to contact arm *f* being completed through the line 348.

Upon completion of the desired washing period contact is re-established at contact arm *i*, thereby causing the closing of the "tank in" solenoid valve 252 by the "tank out" solenoid valve 255 to remain open. Simultaneously contact is established at contact arm *g*, thereby opening "water out" solenoid valve 267 through the line 349 and the line 350 that is connected to the line 341. Under these conditions the wash water is pumped from the processing tank to the sump, and as soon as the liquid level falls below the probe 253 the line 347 is de-energized, thereby closing the solenoid valve 269.

The step following the emptying of the wash water from the processing tank, is followed by disestablishment of contact at contact arms *f* and *g* so as to close the "water in" and "water out" solenoid valves 264 and 267, respectively; and contact is disestablished at contact arm *i*, thereby causing the "tank in" solenoid valve 252 to reopen. Simultaneously, contact is established at contact arm *e*, thereby causing the "hypo in" solenoid valve 273 to open by energizing the lines 351 and 352, the latter being connected to the line 328 which is energized from the relay 308 until the level of the fixing solution reaches the probe 253. Thereupon the "hypo in" solenoid 273 is closed and the "tank out" solenoid is opened to complete the liquid circulating condit means by actuation of relay 306 in the manner hereinabove described, and, after the desired interval of contact with the fixing solution has elapsed, the "tank in" solenoid is closed in the manner above described by actuation of relay 330 and the "hypo out" solenoid valve 278 is simultaneously opened by establishment of contact at contact arm *e*, thereby completing the circuit through lines 353 and 354.

After the fixing solution has been drained from the processing tank 200, the washing sequence is repeated in the manner above described, thereby completing the processing of the photographic elements in the processing tank. At this time contact may automatically be disestablished at the contact arm *a*. However, if drying of the elements is to be effected in the processing tank, contact at contact arm *a* may be retained or reestablished and contact may be established at contact arm *j* which controls a circuit (not shown) for the fan 240, the contacts at contact arms *a* and *j* being disestablished after the desired drying period.

In typical operation utilizing the embodiment shown in FIGS. 15 to 27 the operator first snaps the toggle switch 304 on the front of the instrument panel to "on" position, causing the pilot light to light up. The dial 283 is then turned to "start" position and the timer switch 309 may be closed by pressing the dial 283 toward the panel, thereby initiating the filling of the processing tank with developer solution because the timer discs, when the timer is set at the "start" position, are disposed for filling the processing tank with the developer solution as soon as the timer switch is closed. Since this requires only about 10 seconds, the processing tank usually becomes filled to the operating level determined by the probe 253 by the time the operator has loaded the element holding rack, and as soon as the operator is ready to do so the center cover is opened, the rack is placed in the processing tank and the timer dial is set for the desired developing time, which may be anywhere from 15 minutes to 45 seconds. The center lid is now closed, whereupon the room lights may be turned on and the operator is now free for other duties while the balance of the processing takes place. Typically, the steps after the development consist in rinsing with wash water for 1½ minutes, contact with fixing solution for 6 minutes and a final rinse with wash water for 10 minutes, all steps being carried out at substantially the same temperature, e.g. 68° F.

Access to the "developer" and "hypo" reservoirs may be had by the hinged covers 295 and 296. For draining these reservoirs drain plugs 293 and 294 may be provided. For providing a light seal when the cover 202 is closed, any suitable means may be employed such as the rubber pads 292. For preferred temperature control, improved operation is provided by the employment of the pressure reducing valves 290 and 291 in the water feed in lines 221 and 222, respectively.

I claim:

1. Apparatus for processing an exposed photographic element which comprises a processing tank adapted for disposition of said element in contact with liquid contained therein, a liquid reservoir, liquid supply conduit means for directing liquid from said reservoir to said tank which comprises pump means for effecting flow therethrough and valve means for controlling said flow, liquid return conduit means for directing liquid from said tank to said reservoir which comprises pump means for effecting flow therethrough and valve means for controlling flow of liquid therethrough, liquid circulating conduit means for circulating liquid from said tank and back thereto which comprises pump means for effecting said circulatory flow and valve means for controlling said flow, means for directing liquid entering said processing tank during said circulatory flow to produce a flow pattern providing controlled turbulence of liquid in contact with a photographic element disposed in said tank, and means for actuating said valve means and said pump means for sequentially pumping liquid from said reservoir to said tank through said liquid supply conduit means, then responsive to supply of a predetermined quantity of liquid to said tank from said reservoir instituting and continuing to maintain during a predetermined period the pumping of liquid through said liquid circulating conduit means from said tank and back to said tank and thereafter following the expiration of said predetermined period pumping liquid from said tank to said reservoir through said liquid return conduit means.

2. Apparatus for processing an exposed photographic element which comprises a processing tank adapted for disposition of said element in contact with a solution contained therein and having an inlet and an outlet substantially spaced from said inlet, a liquid reservoir, liquid supply means for instituting and maintaining by pumping a supply of liquid from said reservoir into said tank through said inlet, liquid removing means for removing liquid by pumping from said tank through said outlet at substantially the same rate that liquid is supplied to said tank by said supply means, means for instituting removal of liquid from said tank through said liquid removing means responsive to supply of a predetermined quantity of liquid from said reservoir to said tank by said supply means and while continuing to maintain said supply of solution to said tank, and baffle means within said tank, said baffle means and said liquid supply means for supplying liquid through said inlet being adapted for providing controlled turbulence of liquid in contact with a photographic element disposed in said tank during supply of solution to said tank.

3. Apparatus for processing an exposed photographic element which comprises in combination a processing tank adapted for disposition of said element in contact with a liquid contained therein, a liquid reservoir, means for supplying liquid from said reservoir to said tank to fill said tank from initially empty condition to condition filled with said liquid to a predetermined liquid level for contact with the surface area to be developed of a photographic element within said tank, means actuatable responsive to rise of liquid in said tank to said predetermined level for maintaining said liquid level during a period of predetermined duration and for producing turbulence uniformly and continuously maintained substantially throughout said period of liquid within said tank that is in contact with said surface area of said element, and means after the expiration of said predetermined period for emptying said tank and returning the emptied liquid to said reservoir.

4. Apparatus for processing an exposed photographic element which comprises a processing tank, a first reservoir, means for supplying a first solution from said first reservoir into said tank and into contact with a photographic element disposed therein, means for continuously circulating said first solution so supplied to said tank from said tank and simultaneously back into said tank while maintaining said element in contact with said solution, means for withdrawing said first solution from said tank to said first reservoir, means for supplying a wash liquid into said tank in contact with said element, means for removing said wash liquid from said tank and disposing of same, a second reservoir, means for supplying a second solution from said second reservoir to said tank and into contact with a photographic element contained therein, means for continuously circulating said second solution so supplied into said tank from said tank and simultaneously back into said tank while maintaining said element in contact with said solution, and means for withdrawing said second solution from said tank and returning it to said second reservoir, said supply, circulating and removing means for said first and second solutions, respectively, comprising common conduit means common pump means, and said means for supplying wash liquid into said tank and removing it therefrom for disposal including said common conduit means and said common pump means so as to be flushed with said wash liquid and said tank having baffle means therein for directing said first and second solutions while being supplitd to said tank during said continuous circulation thereof so as to provide controlled turbulence of said respective solutions throughout the zone of contact thereof with a photographic element disposed in said tank.

5. Apparatus according to claim 4 which comprises actuating means for effecting controlled actuation in sequence of said supply, circulating and removal means for said first solution, said supply and removal means for said wash liquid and said supply, circulating and removal for said second solution, said actuating means including means for initiating operation of said circulating means for said first and said second solutions, respectively, responsive to supplying a predetermined quantity of said first and second solutions, respectively, into said tank.

6. Apparatus for processing an exposed photographic element which comprises a processing tank adapted for disposition of said element in contact with liquid contained therein and having an inlet and an outlet spaced from said inlet, liquid circulating conduit means adapted for continuously circulating liquid from said outlet and simultaneously back into said tank through said inlet, pump means for effecting said circulation, first valve means between said outlet and said pump means for controlling flow of liquid in said conduit means, second valve means between said pump means and said inlet for controlling flow of liquid in said conduit means, a liquid reservoir having an inlet and an outlet, valve controlled conduit means connecting said outlet of said reservoir with said liquid circulating conduit means between said first valve and said pump means, valve controlled conduit means connecting said inlet of said reservoir with said liquid circulating conduit means between said pump means and said inlet of said tank, and means responsive to rise of liquid in said processing tank to a predetermined level for opening said first valve and closing the valve in said conduit means connecting said outlet of said reservoir with said liquid circulating conduit means.

7. Apparatus for processing an exposed photographic element which comprises a processing tank adapted for disposition of said element in contact with liquid contained therein and having an outlet and an inlet spaced from said outlet, liquid circulating conduit means adapted for continuously circulating liquid from said outlet and simultaneously back into said tank through said inlet, pump means for circulating liquid in said circulating conduit means, a first valve contained in said circulating conduit means between said outlet and said pump means, a second valve contained in said circulating conduit means between said pump means and said inlet, a first reservoir, a valve controlled conduit communicated between said reservoir and a connection to said circulating conduit means between said first valve and said pump means, a valve controlled conduit communicating between said reservoir and a connection to said circulating conduit means between said pump means and said inlet, a second reservoir, a valve controlled conduit communicating between said second reservoir and a connection to said circulating conduit means between said outlet and said pump means, a valve controlled conduit communicating between said second reservoir and a connection to said circulating conduit means between said second pump means and said inlet, and valve controlled means for passing a washing liquid through said tank and through said circulating conduit means and in operative relation with said pump means for flushing said parts.

8. Apparatus for processing an exposed photographic element which comprises a processing tank adapted for disposition of said element in contact with liquid contained therein, an inlet line having a pump therein for pumping liquid into said tank, an outlet line independent of said inlet line having a pump therein for pumpnig liquid out of said tank, a first reservoir having valve controlled exit and entrance lines connected to said inlet and outlet lines, respectively, at stations more remote from said tank than said pump, a second reservoir having valve controlled exit and entrance lines connected to said inlet and outlet lines, respectively, at stations more remote from said tank than said pump and valve controlled means for supplying wash liquid to said inlet line at a point more remote from said tank than said stations, and valve controlled means for discharging wash liquid from said outlet line at a point more remote from said tank than said stations.

9. Apparatus for processing an exposed photographic element which comprises a processing tank, supply means for supplying a liquid into said tank, a pump comprised in said supply means, liquid withdrawing means for withdrawing liquid from said tank, a pump comprised in said liquid withdrawing means, means for initiating operation of said supply means, means for initiating operation of said liquid withdrawing means responsive to feeding a predetermined quantity of liquid into said tank by operation of said supply means, said liquid withdrawing means being adapted to pump liquid from said tank by said pump comprised therein at substantially the same rate that liquid is pumped into said tank by said pump in said supply means, means for stopping operation of said supply means after expiration of a predetermined period of simultaneous operation of said supply means and said withdrawal means, and means for stopping operation of said withdrawal means after said tank has been emptied of liquid contained therein.

10. A method of processing an exposed photographic element disposed in a processing tank which comprises introducing developing solution into said tank for contacting said element in submerged relation therewith, then for a predetermined period withdrawing developing solution from said tank while continuing to introduce developing solution in said tank at substantially the same rate, said developing solution being introduced at such a rate and being so directed as to maintain mild agitation of said solution within said tank substantially throughout said predetermined period, then discontinuing introduction of developing solution into said tank and continuing to withdraw developing solution from said tank until said tank is empty, then introducing water into said tank in contact with said element to wash said element and flush said tank, then discontinuing introduction of said water and withdrawing water from said tank until it is empty, thereafter introducing fixing solution into said tank until said element is submerged therein, then for a predetermined period withdrawing fixing solution from said tank while continuing to introduce it at substantially the same rate, said fixing solution being introduced at such rate and being so directed as to maintain mild agitation of said fixing solution within said tank substantially throughout predetermined period, then discontinuing introducing the fixing solution into said tank while continuing its withdrawal until said tank is empty, then introducing water into said tank in contact with said element to wash said element and flush said tank and thereafter discontinuing said introduction of water and continuing withdrawal of water until said tank is empty.

11. In the processing of an exposed photographic element in a processing tank, the steps of instituting supply of a treating solution by pumping same into said tank when it is empty and maintaining said supply until said tank is filled to a predetermined level for submerged contact with surface area to be developed of said photographic element within the tank, then instituting removal of said solution by pumping same from said tank and maintaining said removal while continuing said supply of said solution, said supply and said removal being at substantially the same rate and said solution being supplied at such rate and being so directed as to produce within said tank substantial agitation of said solution throughout the zone of contact of said solution with said element discontinuing said supply of said solution after the expiration of a predetermined period of time, and continuing said removal of said solution from said tank after discontinuing supply of said solution thereto until said solution is emptied from said tank.

12. In the processing of an exposed photographic element in a processing tank the steps of instituting supply of a treating solution into said tank and maintaining said supply until said tank is filled to a predetermined level for submerged contact with surface area to be developed of said photographic element, then instituting removal of said treating solution from said tank and maintaining said removal while continuing said supply of said solution, said supply and said removal being at substantially the same rate, discontinuing said supply of said solution after a predetermined period of time, continuing said removal until said tank is empty, and thereafter introducing a washing liquid into said processing tank in contact with said element, said removal being effected by mechanically impelling said solution from said tank through a conduit until said processing tank is empty and after sail tank has been emptied mechanically impelling air through said conduit for a substantial period of time for purging said conduit of residual solution prior to introducing said washing liquid into said tank.

13. Apparatus for processing an exposed photographic element which comprises in combination a processing tank adapted for disposition of sail element in contact with a liquid contained therein, a climatizing tank whose side walls encompass said processing tank and which is adapted to contain a liquid in indirect heat exchange relation with liquid in said processing tank, means for supplying liquid to said climatizing tank, means for maintaining liquid n sad climatzing tank at a substantially constant temperature, means for supplying liquid from said climatizing tank to the interior of said processing tank, and means for removing liquid so supplied to said processing tank from said processing tank while maintained out-of-contact with liquid in said climatizing tank.

14. Apparatus according to claim 13 which comprises an overflow line leading from said climatizing tank, and means for supplying liquid to said tank at substantially constant temperature.

15. Apparatus for processing an exposed photographic element which comprises in compination a processing tank adapted for disposition of said element in contact with a liquid contained therein, a reservoir, means for pumping liquid from said reservoir to said processing tank and for pumping liquid from said processing tank to said reservoir, a climatizing tank having side walls encompassing said processing tank and said reservoir and adapted to hold a liquid in indirect heat exchange relation with liquid in said processing tank and with liquid in said reservoir, means for pumping liquid from said climatizing tank into said processing tank to wash said element disposed therein after liquid has been returned from said processing tank to said reservoir, means for pumping the wash liquid from said processing tank to waste while maintained out-of-contact with liquid in said climatizing tank, means for supplying liquid at a substantially constant temperature to said climatizing tank, and an overflow line for directing liquid from said climatizing tank.

16. Apparatus for processing an exposed photographic element which comprises in combination a processing tank adapted for disposition of said element in contact with a liquid contained therein, a climatizing tank whose side walls encompass said processing tank and is adapted to contain a liquid in indirect heat exchange relation with liquid in said processing tank, liquid supply means for supplying liquid to said climatizing tank, means for maintaining liquid in said climatizing tank at substantially constant temperature, means for supplying liquid from said climatizing tank to said processing tank to fill said processing tank, means for imparting turbulence to liquid so supplied to said processing tank during a period of substantial duration while the processing tank remains substantially full, means for removing liquid from said processing tank at the expiration of said period while maintaining it out of contact with liquid in said climatizing tank, means for directing from said liquid supply means an additional quantity of liquid to said processing tank during actuation of said turbulence imparting means, and means for taking off said additional liquid from said processing tank during actuation of said turbulence imparting means and while maintaining it out-of-contact with liquid in said climatizing tank.

17. Apparatus for processing an exposed photographic element which comprises in combination a processing tank adapted for the disposition of said element in contact with liquid contained therein, a climatizing tank whose side walls encompass said processing tank and is adapted to contain a liquid in indirect heat exchange relation with liquid in said processing tank, water supply means for supplying water at a predetermined temperature to said climatizing tank, an overflow outlet for said climatizing tank, means for pumping water from said climatizing tank into said processing tank to fill said processing tank, recycling means for pumping liquid from said processing tank and simultaneously recycling it back into said processing tank while maintained out-of-contact with liquid in said climatizing tank, means for pumping water from said processing tank to waste to empty said tank, supplementary water supply means for directing water at said predetermined temperature into said processing tank from said water supply means during operation of said recycling means, and overflow conduit means for said processing tank through which water supplied by said supplementary water supply means to said processing tank is removed from said processing tank while maintained in out-of-contact with water in said climatizing tank.

18. Apparatus for processing an exposed photographic element which comprises a processing tank adapted for disposition of said element in contact with a liquid contained therein and having an outlet and an inlet, a liquid supply source, an inlet conduit connected with said inlet, a shut off valve in said inlet conduit spaced substantially from said inlet, means for supplying liquid from said source through said inlet conduit, an outlet conduit connected to said outlet, pump means in said outlet conduit for pumping liquid from said tank through said outlet and through said outlet conduit, and a by-pass conduit connected adjacent one end thereof to said outlet conduit on the suction side of said pump and connected to said inlet conduit adjacent said shut off valve and between said shut off valve and said inlet, said by-pass conduit having substantially less flow capacity than said inlet and outlet conduits.

19. Apparatus according to claim 18 which comprises means for adjusting the cross-sectional flow capacity of said by-pass conduit.

20. Apparatus for processing an exposed photographic element which comprises a processing tank adapted for disposition of said element in contact with a liquid contained therein and having an outlet and an inlet, liquid circulating conduit means adapted for circulating liquid from said outlet and back into said tank through said inlet, pump means in said liquid circulating conduit means for effecting said circulation, first valve means between said outlet and said pump means for controlling flow of liquid in said liquid circulating conduit means, second valve means between said pump means and said inlet for controlling flow of liquid in said conduit means, a first reservoir having an inlet and an outlet, conduit means communicating between said reservoir outlet and a connection to said circulating conduit means between said first valve means and said pump means and having a shut off valve therein immediately adjacent said connection, conduit means communicating between said reservoir inlet and a connection to said circulating conduit means between said pump means and said second valve means and having a shut off valve therein immediately adjacent said connection, a second reservoir having an inlet and an outlet, conduit means communicating between said second reservoir outlet and a connection to said circulating conduit means between said first valve means and said pump means and having a shut off valve therein immediately adjacent said connection, conduit means communicating between said pump means and said second reservoir inlet and having a shut off valve therein immediately adjacent said connection, a liquid discharge conduit which is connected to said liquid circulating conduit means by a connection disposed between said second valve means and said pump means and having a shut off valve therein immediately adjacent said connection, said first and second valve means and said connections to said liquid circulating conduit being in manifold groupings on opposite sides of said pump means in immediate proximity thereto, and valve controlled means for introducing a washing liquid into said processing tank and said liquid circulating conduit means for passage therethrough impelled by said pump means.

21. Apparatus for processing an exposed photographic element which comprises a processing tank for disposition of said element in contact with a liquid contained therein, a liquid reservoir, liquid supply conduit means for directing liquid from said reservoir to said tank which comprises pump means for effecting flow therethrough, first solenoid valve means between said reservoir and said pump means for controlling said flow, a first swing gate check valve between said first solenoid valve means and said pump means for preventing back flow toward said solenoid valve, liquid return conduit means for directing liquid from said tank to said reservoir which comprises pump means for effecting flow of liquid therethrough, second solenoid valve means between said pump means and said reservoir for controlling said flow, and a second swing gate check valve between said solenoid valve means and said reservoir to prevent back flow toward said solenoid valve, a source of washing liquid, and means for directing washing liquid from said source through the portion of said liquid supply conduit means from said first swing gate check valve to said pump means and through the portion of said liquid return conduit means containing said pump means and extending to said second solenoid valve means.

22. Apparatus for processing an exposed photographic element which comprises a processing tank adapted for disposition of said element in contact with a liquid contained therein and having an inlet and an outlet, liquid circulating conduit means adapted for circulating liquid from said outlet and back into said tank through said inlet, pump means for effecting said circulation, first valve means between said outlet and said pump means for controlling flow of liquid in said conduit means, second valve means between said pump means and said inlet for controlling flow of liquid in said conduit means, a liquid reservoir having an inlet and an outlet, supply conduit means connecting said outlet of said reservoir with said liquid circulating conduit means between said first valve means and said pump means, a solenoid valve in said supply conduit means, a swing gate check valve in said supply conduit means adjacent said liquid circulating conduit means for preventing back flow of liquid toward said solenoid valve, return conduit means connecting said inlet of said reservoir with said liquid circulating conduit means between said pump means and said second valve means, a solenoid valve in said return conduit means adjacent said liquid circulating conduit means and a swing gate check valve in said return conduit means between said inlet of said reservoir and said solenoid valve for preventing back flow of liquid toward said solenoid valve.

23. Apparatus for processing an exposed photographic element which comprises a processing tank, an inlet adjacent the bottom thereof disposed for injecting a liquid, an outlet adjacent the bottom of said tank, means for pumping liquid into said tank through said inlet and simultaneously pumping liquid out of said tank through said outlet while maintaining liquid in said tank in contact with said element, a vertically disposed baffle within said processing tank extending from above the normal liquid level in said tank to adjacent spaced relation to the bottom of said tank and in continuous generally equispaced relationship to the side walls of said tank to provide a continuous passage between said baffle and said side walls, said baffle being open at the bottom except for a horizontally disposed plate disposed adjacent the region of said inlet into said tank, and means for supporting a plurality of exposed photographic elements within the confines of said baffle in contact with liquid within said processing tank.

24. Apparatus according to claim 23 wherein said processing tank comprises an overflow outlet adjacent the top thereof for outflow of liquid therethrough and an opening in the side wall of said baffle at the liquid level in said tank determined by said overflow outlet for passage of any floating foreign particles therethrough and thence to said overflow outlet, and means for introducing liquid into said tank for overflow through said overflow outlet during actuation of said means for pumping liquid into said tank through said inlet and simultaneously pumping liquid out of said tank through said outlet.

25. Apparatus for processing an exposed photographic element which comprises a processing tank adapted for disposition of said element in contact with a liquid contained therein and having an outlet and an inlet, a first liquid reservoir having an outlet and an inlet, a second liquid reservoir having an outlet and an inlet, a climatizing tank whose side walls encompass said processing tank and said first and second reservoirs and is adapted to contain a liquid in indirect heat exchange relation with liquid in said processing tank and in said first and second reservoirs, a source for supplying a washing liquid at a substantially constant temperature, means for directing washing liquid from said source into said climatizing tank, an overflow outlet for said climatizing tank, liquid circulating conduit means for circulating liquid from said processing tank outlet and back into said tank through said inlet therefor, pump means disposed in said liquid circulating conduit means on the exterior of said climatizing tank, first valve means between said processing tank outlet and said pump means for controlling flow of liquid in said circulating conduit means, second valve means between said pump means and said processing tank inlet, conduit means communicating between said first reservoir outlet and a connection to said liquid circulating conduit means between said first valve means and said pump means and having a shut off valve therein immediately adjacent said connection, conduit means communicating between said first reservoir inlet and a connection to said circulating conduit means between said pump means and said second valve means and having a shut off valve therein immediately adjacent said connection, conduit means communicating between said second reservoir outlet and a connection to said circulating conduit means between said first valve means and said pump means and having a shut off valve therein immediately adjacent said connection, conduit means communicating between said second reservoir inlet and a connection to said liquid circulating conduit means between said pump means and said second valve means and having a shut off valve therein immediately adjacent said connection, a conduit communicating between the interior of said climatizing tank and a connection to said liquid circulating conduit between said first valve means and the aforesaid connections for said conduits communicating with said first and second reservoirs and having a shut off valve therein immediately adjacent said connection, said first and second valve means and the aforesaid connections being in manifold groupings on opposite sides of said pump means in immediate proximity thereto, a liquid discharge conduit connected to said liquid circulating conduit means in immediate proximity to said second valve means and between said second valve means and said connections for said conduits communicating, respectively, with the inlets to said first and second reservoirs and having a shut off valve therein immediately adjacent said liquid circulating conduit means, a by-pass line having substantially lower flow capacity than said liquid circulating conduit means which communicates between the suction side of said pump means and a connection to said liquid circulating conduit means that is immediately adjacent said second valve means and that is between said second valve means and said processing tank, valve controlled conduit means for directing washing liquid from said source into said processing tank, an overflow line for discharge of liquid from said processing tank, and control means for actuating the aforesaid shut off valves and valve means during operation of said pump means for filling said processing tank to a predetermined level with liquid from said first reservoir, circulating said liquid through said liquid circulating conduit means from said processing tank and back into said processing tank followed by return of said liquid to said first reservoir, then pumping washing liquid from said climatizing tank into said processing tank, circulating it from said processing tank and back into said processing tank while at the same time introducing additional liquid which overflows from said processing tank through said overflow line, followed by discharging the washing liquid through said liquid discharge line, then filling said processing tank with liquid from said second reservor, circulating said liquid from said processing tank and back into said processing tank, followed by return of said liquid to said second reservoir, and then introducing washing liquid into said processing tank, circulating it from said processing tank and back into said processing tank while at the same time adding additional liquid which overflows from said processing tank through said overflow line followed by discharge of the washing liquid through said liquid discharge line.

26. Apparatus according to claim 25 wherein said inlet and outlet for said processing tank providing the terminals for said liquid circulating conduit means are adjacent the bottom thereof and said inlet is disposed for setting up a swirling action of liquid in said tank when liquid is injected therethrough into said tank and which comprises a baffle which extends from above the normal liquid level in said processing tank to adjacent spaced relation to the bottom of said tank and which is continuously disposed in generally equi-spaced relation to the side walls of said processing tank, said baffle being open at the bottom except for a horizontally disposed plate adjacent the region of said inlet to said processing tank and said baffle having an opening in the side wall at the level of liquid in said tank determined by said overflow line from said tank for passage therethrough of floating particles when the liquid in said tank is at said level.

27. Apparatus according to claim 25 wherein said valve means and shut off valves are solenoid valves and which comprises swing gate check valves disposed in the said conduits communicating, respectively, with said climatizing tank and with the outlets of said first and second reservoirs and disposed between the said valves in said conduits and the said connections of said conduits to said liquid circulating conduit means to prevent back flow of liquid toward said valves and swing gate check valves in the said conduits communicating, respectively, with said inlets to said first and second reservoirs and in said liquid discharge line immediately adjacent the respective valves in said lines and the far side thereof with respect to said pump means to prevent back flow of liquid toward said valves.

28. Apparatus for processing an exposed photographic element which comprises a processing tank for disposition of said element in contact with a liquid contained therein and having an inlet and an outlet adjacent the bottom thereof with said outlet spaced substantially from said inlet, a first liquid reservoir having an inlet and an outlet, a second liquid reservoir having an inlet and an outlet, a pump having an inlet and an outlet, conduit means interconnecting said outlet of said processing tank with said inlet of said pump, conduit means interconnecting said outlet of said first reservoir with said inlet of said pump, conduit means interconnecting said outlet of said second reservoir with said inlet of said pump, conduit means interconnecting said outlet of said pump with said inlet of said processing tank, conduit means interconnecting said outlet of said pump with said inlet of said first reservoir, conduit means interconnecting said outlet of said pump with said inlet of said second reservoir, valve means in said conduits, valve actuating means for actuating said valve means for successively directing liquid pumped by said pump into said tank from said first reservoir to fill said tank, then simultaneously from said tank and back into said tank for a substantial period of time, and subsequently from said tank into said first reservoir to empty said tank and thereafter for directing liquid pumped by said pump into said tank from said second reservoir to fill said tank, then simultaneously from said tank and back into said tank for a substantial period of time and subsequently from said tank back into said second reservoir, and means for flushing said tank with water, said conduit means interconnecting said tank outlet with said pump inlet, said pump, and said conduit means interconnecting said pump outlet with said tank inlet after emptying of said tank into said first reservoir and prior to filling said tank from said second reservoir.

References Cited in the file of this patent

UNITED STATES PATENTS

| | | |
|---|---|---|
| 1,495,473 | Fitzgerald | May 27, 1924 |
| 1,810,857 | Thompson et al. | June 16, 1931 |
| 2,216,388 | Hampel | Oct. 1, 1940 |
| 2,226,438 | Moore | Dec. 24, 1940 |
| 2,248,056 | Blaney | July 8, 1941 |
| 2,327,733 | Moore | Aug. 24, 1943 |
| 2,491,620 | Packard | Dec. 20, 1949 |
| 2,570,627 | Albin | Oct. 9, 1951 |
| 2,621,571 | Katzen et al. | Dec. 16, 1952 |
| 2,715,405 | Frech | Aug. 16, 1955 |
| 2,764,074 | Rosenberg | Sept. 25, 1956 |
| 2,800,845 | Nieth | July 30, 1957 |

FOREIGN PATENTS

| | | |
|---|---|---|
| 567,200 | Great Britain | Feb. 1, 1945 |
| 685,474 | Great Britain | Jan. 7, 1953 |

UNITED STATES PATENT OFFICE
CERTIFICATE OF CORRECTION

Patent No. 3,000,288                       September 19, 1961

Douglas F. Winnek

It is hereby certified that error appears in the above numbered patent requiring correction and that the said Letters Patent should read as corrected below.

Column 6, line 48, for "liquids" read -- liquid level --; column 7, line 36, for "manualy" read -- manually --; column 10, line 59, for "suplied" read -- supplied --; column 11, line 14, for "time" read -- timer --; column 13, line 5, for "keeps" read -- keep --; column 14, line 16, for "circiuts" read -- circuits --; column 15, lines 64 and 65, for "empolyment" read -- employment --; column 19, line 38, after "normal" insert -- liquid --; column 21, line 45, for "or" read -- of --; column 23, line 2, after "27" insert a period; column 23, line 51, strike out "low"; column 24, line 53, for "condit" read -- conduit --; column 27, line 54, for "pumpnig" read -- pumping --; column 29, line 9, for "sail" read -- said --; line 15, for "n sad climatzing" read -- in said climatizing --; line 26, for "compination" read -- combination --; column 33, line 15, for "reservor" read -- reservoir --.

Signed and sealed this 24th day of July 1962.

(SEAL)
Attest:

ERNEST W. SWIDER

Attesting Officer

DAVID L. LADD

Commissioner of Patent